US009920795B2

(12) United States Patent
Mordukhovich et al.

(10) Patent No.: US 9,920,795 B2
(45) Date of Patent: *Mar. 20, 2018

(54) MULTI-LEVEL TORQUE CLUTCH

(71) Applicant: AVL Powertrain Engineering, Inc., Plymouth, MI (US)

(72) Inventors: Gregory Mordukhovich, Bloomfield Hills, MI (US); Michael Kozan, Canton, MI (US)

(73) Assignee: AVL Powertrain Engineering, Inc., Plymouth, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/956,861

(22) Filed: Dec. 2, 2015

(65) Prior Publication Data

US 2016/0178015 A1  Jun. 23, 2016

Related U.S. Application Data

(60) Provisional application No. 62/095,417, filed on Dec. 22, 2014.

(51) Int. Cl.
*F16D 25/063* (2006.01)
*F16D 13/70* (2006.01)
(Continued)

(52) U.S. Cl.
CPC ............ *F16D 13/70* (2013.01); *F16D 13/52* (2013.01); *F16D 25/0638* (2013.01)

(58) Field of Classification Search
CPC ...... F16D 13/46; F16D 25/0638; F16D 13/52; F16D 13/70
See application file for complete search history.

(56) References Cited

U.S. PATENT DOCUMENTS 3,384,214 A    5/1968  Wilson
4,020,933 A *  5/1977  Gill ............... F16D 25/0638
                                              192/109 F
(Continued)

FOREIGN PATENT DOCUMENTS

DE  102013224591 A1  6/2014
JP     S61180028 A   8/1986
JP       07042757    2/1995

OTHER PUBLICATIONS

Extended European Search Report for Application No. 16157516.2 dated Jul. 29, 2016.
(Continued)

*Primary Examiner* — Ramya P Burgess
*Assistant Examiner* — Lillian T Nguyen
(74) *Attorney, Agent, or Firm* — Harness, Dickey & Pierce, P.L.C.

(57) ABSTRACT

A clutch assembly is disclosed having a clutch housing and a shaft. A clutch pack selectively couples rotation of the clutch housing and the shaft. The clutch pack includes a primary backing plate, a reaction plate, first and second friction plates disposed between the backing plate and the reaction plate, and a secondary backing plate disposed between the first and second friction plates. A first actuator selectively applies pressure to the reaction plate to move the reaction plate toward the primary backing plate. A second actuator controls movement of the secondary backing plate to switch the clutch pack between a low torque state and a high torque state. In the low torque state, the secondary backing plate cannot move longitudinally toward the primary backing plate beyond a locked position. In the high torque state, the secondary backing plate can move beyond the locked position.

29 Claims, 15 Drawing Sheets

(51) Int. Cl.
F16D 13/52 (2006.01)
F16D 25/0638 (2006.01)

(56) References Cited

U.S. PATENT DOCUMENTS

| | | |
|---|---|---|
| 4,144,955 A | 3/1979 | Garnier |
| 4,372,434 A | 2/1983 | Aschauer |
| 4,396,101 A | 8/1983 | Black |
| 5,901,826 A | 5/1999 | Datta |
| 6,095,946 A | 8/2000 | Maguire et al. |
| 8,409,053 B2 | 4/2013 | Samie et al. |
| 8,640,843 B2 | 2/2014 | Ogasawara et al. |
| 9,677,622 B2* | 6/2017 | Mordukhovich ....... F16D 13/52 |
| 2007/0080041 A1 | 4/2007 | Goto et al. |
| 2011/0067969 A1 | 3/2011 | Reed et al. |
| 2016/0252140 A1* | 9/2016 | Mordukhovich ... F16D 25/0638 192/66.3 |
| 2016/0252141 A1* | 9/2016 | Mordukhovich ....... F16D 13/46 192/70.21 |
| 2016/0363175 A1* | 12/2016 | Vierk ...................... F16D 13/52 |

OTHER PUBLICATIONS

Jen, Tien-Chen et al., Thermal Analysis of a Wet-Disk Clutch Subjected to a Constant Energy Engagement, ScienceDirect, Mar. 2007.
Extended European Search Report for Application No. 16157514.7 dated May 6, 2016.
Chinese Office Action for Application No. 201521075637.3 dated Apr. 5, 2016.

* cited by examiner

MULTI-LEVEL TORQUE CLUTCH

CROSS-REFERENCE TO RELATED APPLICATIONS

This application claims the benefit of U.S. Provisional Application No. 62/095,417, filed on Dec. 22, 2014. The entire disclosure of the application referenced above is incorporated herein by reference.

FIELD

The present disclosure generally relates to the field of vehicle transmissions. More specifically, a multi-level torque clutch assembly is disclosed having a primary backing plate and a secondary backing plate.

BACKGROUND

This section provides background information related to the present disclosure which is not necessarily prior art.

Torque clutch assemblies are commonly used in vehicle transmissions to shift into a forward gear, to shift between different forward gears, or to shift into a reverse gear. As a shift is being effectuated by the transmission, the torque clutch assembly selectively supplies torque from a prime mover, such as an engine, to one or more gears of the transmission. Because the torque clutch assembly can decouple the one or more gears of the transmission from the prime mover and can provide limited slip between the one or more gears of the transmission and the prime mover, shifts can be accomplished without stalling the engine and/or binding the transmission.

The torque clutch assembly may generally include a clutch housing and a shaft that is disposed within the clutch housing. A clutch pack may be disposed radially between the clutch housing and the shaft that selectively couples rotation of the clutch housing and the shaft. The clutch pack may include various combinations of friction plates that transfer torque between the clutch housing and the shaft when the friction plates are pressed together by a clutch actuator. While the friction plates are rotatably coupled to either the clutch housing or the shaft, they are moveable in a longitudinal direction with respect to the clutch housing and the shaft. A backing plate may be provided at one end of the clutch pack that is retained on either the clutch housing or the shaft. Longitudinal movement of this backing plate relative to the clutch housing and the shaft may be limited such that the backing plate acts as a stop for the friction plates when the friction plates are pushed towards the backing plate by the clutch actuator. A reaction plate may be provided at an opposite end of the clutch pack. Like the friction plates, the reaction plate is moveable in the longitudinal direction with respect to the clutch housing and the shaft. The clutch actuator may be configured to apply pressure to the reaction plate such that the friction plates are squeezed between the reaction plate and the backing plate. Accordingly, actuation of the clutch actuator longitudinally compresses the clutch pack.

Depending upon different power flows through the transmission and different levels of torque multiplication occurring before the torque clutch assembly (i.e. torque multiplication occurring at one or more points positioned between the prime mover and the torque clutch assembly), different torque transmission values through the torque clutch assembly may be desirable. Traditionally, different torque transmission values transmitted through torque clutch assemblies were achieved by varying the pressure that the clutch actuator applies to the reaction plate. Essentially, by varying the clamping (i.e. squeezing) force applied to the friction plates by the reaction plate and the primary backing plate, different torque transmission values could be achieved by increasing or decreasing the amount of slip between the friction plates, the reaction plate, and the backing plate. This option has its drawbacks, however, since the friction plates are typically torque sensitive in only a very narrow range of applied pressure. As a result, the pressure that the clutch actuator applies to the reaction plate can only be varied so much before clutch operation suffers making it difficult to produce a clutch assembly that is effective at both high and low torque transmission values.

SUMMARY

This section provides a general summary of the disclosure, and is not a comprehensive disclosure of its full scope or all of its features.

The subject disclosure provides for a multi-level torque clutch assembly. The multi-level torque clutch assembly includes a clutch housing having an internal surface that defines an inner cavity within the clutch housing. A shaft extending along a longitudinal axis is disposed within the inner cavity of the clutch housing. The shaft has an outer surface. A clutch pack is disposed radially between the clutch housing and the shaft. The clutch pack selectively couples rotation of the clutch housing and the shaft. The clutch pack includes a first end and a second end that is opposite the first end and that is longitudinally spaced from the first end. The multi-level torque clutch assembly includes a first actuator that selectively applies a predetermined pressure to the first end of the clutch pack to force the first end of the clutch pack toward the second end of the clutch pack. Accordingly, the predetermined pressure applied by the first actuator longitudinally compresses the clutch pack.

The clutch pack includes a primary backing plate that is disposed at the second end of the clutch pack. The primary backing plate is retained on either the clutch housing or the shaft such that the primary backing plate cannot move longitudinally relative to the clutch housing and the shaft beyond a predetermined limit. The clutch pack also includes a reaction plate that is disposed at the first end of the clutch pack. The reaction plate operably receives the predetermined pressure from the first actuator and is moveable along the longitudinal axis relative to the clutch housing and the shaft. Additionally, the clutch pack includes a first friction plate and a second friction plate that are disposed adjacent one another and between the primary backing plate and the reaction plate. The first and second friction plates are moveable along the longitudinal axis relative to the clutch housing and the shaft.

The clutch pack further includes a secondary backing plate that is disposed between the first and second friction plates. The multi-level torque clutch assembly includes a second actuator that controls the movement of the secondary backing plate to selectively switch the clutch pack between a low torque state and a high torque state. In the low torque state, the second actuator prevents the secondary backing plate from moving longitudinally toward the primary backing plate beyond a locked position. Therefore, in the low torque state, only one of the first and second friction plates is squeezed between the reaction plate and the secondary backing plate when the predetermined pressure is applied to the reaction plate. In the high torque state, the second actuator permits longitudinal movement of the secondary backing plate toward the primary backing plate beyond the locked position. Therefore, in the high torque state, the secondary backing plate and both the first and second friction plates are squeezed between the reaction plate and the primary backing plate when the predetermined pressure is applied to the reaction plate.

In accordance with another aspect, the subject disclosure provides a method of operating the multi-level torque clutch assemblies described above. The method comprises the steps of rotating at least one of the clutch housing and the shaft and rotating one or more components of a clutch pack in response to the step of rotating at least one of the clutch housing and the shaft. The components of the clutch pack include, at the least very least, the reaction plate, the primary backing plate, the first and second friction plates, and the secondary backing plate. The method also includes the steps of initiating the low torque state by preventing the secondary backing plate from moving longitudinally toward the primary backing plate beyond the locked position and applying the predetermined pressure to the reaction plate to squeeze one of the first and second friction plates between the reaction plate and the secondary backing plate. In the low torque state, another one of the first and second friction plates is isolated from the predetermined pressure because the secondary backing plate cannot move beyond the locked position to press the other one of the friction plates against the primary backing plate. The method further includes the steps of initiating the high torque state by allowing the secondary backing plate to move longitudinally toward the primary backing plate beyond the locked position and applying the predetermined pressure to the reaction plate to squeeze both of the first and second friction plates and the secondary backing plate between the reaction plate and the primary backing plate.

Rather than varying the predetermined pressure that the first actuator applies to the reaction plate, the secondary backing plate and second actuator of the disclosed multi-level torque clutch assembly are used to selectively change the number of friction plates that transfer torque between the shaft and the clutch housing. Accordingly, the disclosed multi-level torque clutch assembly provides two different torque transmission values through the multi-level torque clutch assembly without varying the predetermined pressure that the first actuator applies to the reaction plate. Advantageously, the predetermined pressure can be maintained at an optimum value for proper friction plate operation. At the same time, high and low torque transmission values are provided by selectively isolating one or more of the friction plates by controlling the movement of the secondary backing plate with the second actuator. This provides for better clutch control and easier calibration, particularly when a large difference between the high and low torque transmission values is desired.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
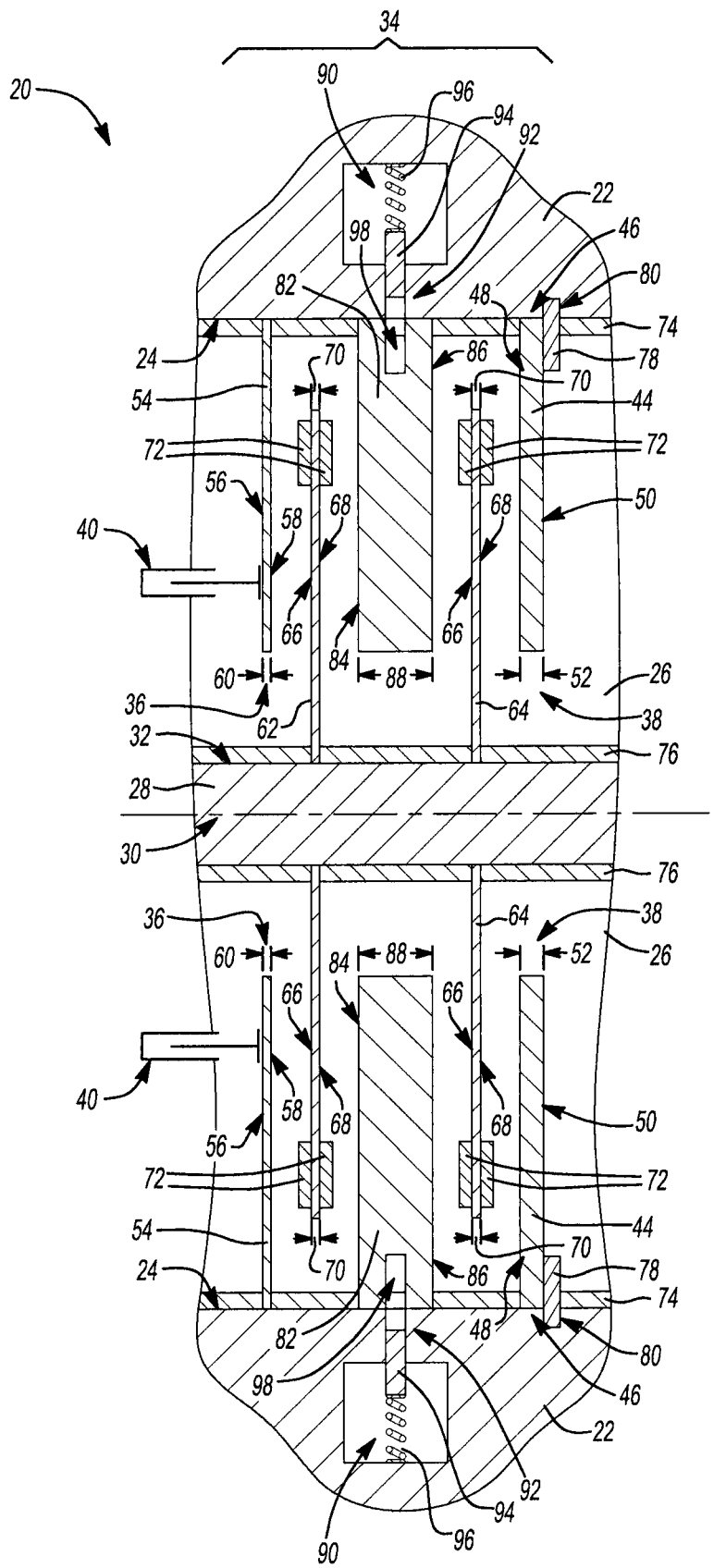
FIG. 1 is a partial, cross-sectional view of an exemplary multi-level torque clutch assembly constructed in accordance with the subject disclosure where the multi-level torque clutch assembly has a secondary backing plate and where the multi-level torque clutch assembly is shown in an open state.

Referring to the Figures, wherein like numerals indicate corresponding parts throughout the several views, a multi-level torque clutch assembly 20 is disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Generally, torque clutch assemblies, such as the multi-level torque clutch assemblies 20 disclosed in the Figures, may be used in a transmission of a vehicle to shift into a forward gear, to shift between different forward gears, or to shift into a reverse gear. The transmission may generally have a transmission case that houses the forward and/or reverse gears. The disclosed multi-level torque clutch 20 may be disposed within the transmission case, connected in series with the transmission case, or integral with the transmission case.

Figure 2:
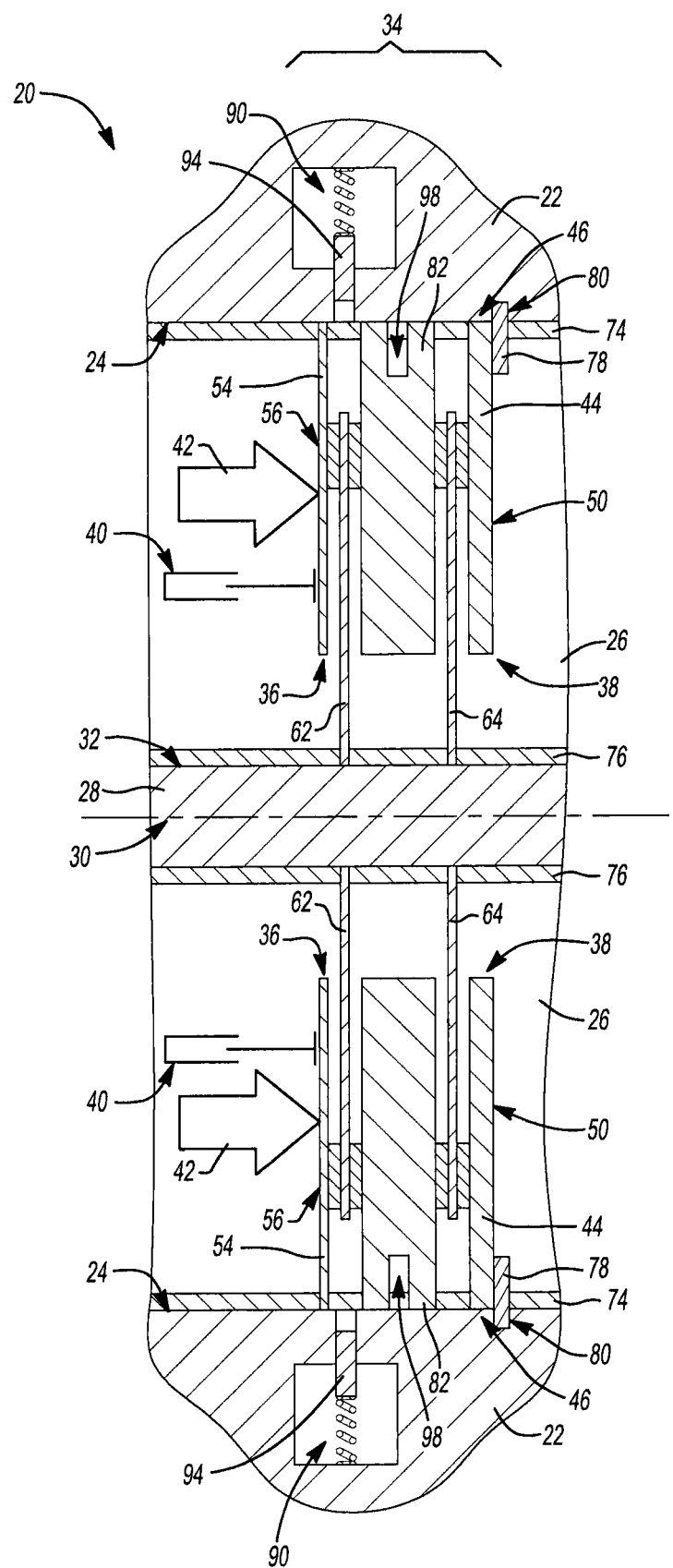
FIG. 2 is a partial, cross-sectional view of the multi-level torque clutch assembly of FIG. 1 where the multi-level torque clutch assembly is shown in a closed state with the secondary backing plate disengaged.
Figure 3:
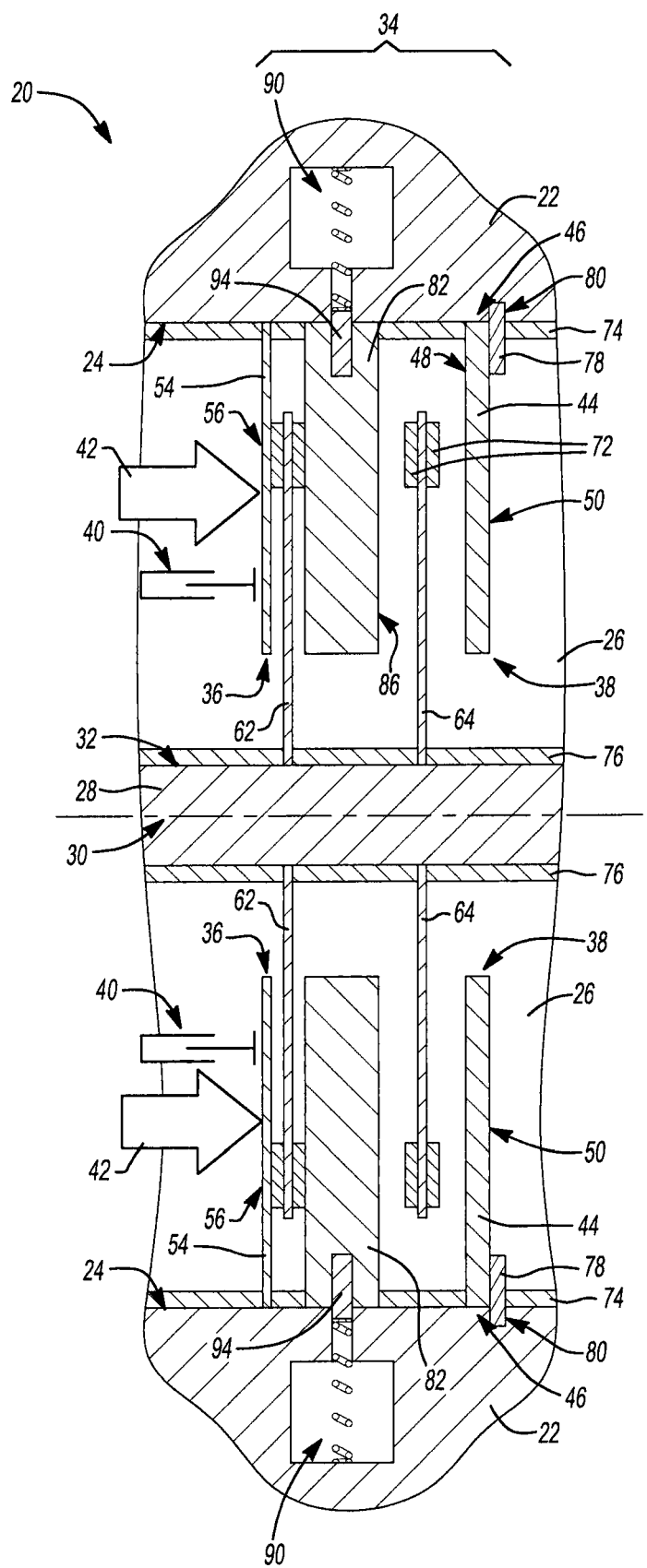
FIG. 3 is a partial, cross-sectional view of the multi-level torque clutch assembly of FIG. 1 where the multi-level torque clutch assembly is shown in the closed state with the secondary backing plate engaged in a locked position.

As illustrated in FIGS. 1-3, the multi-level torque clutch assembly 20 includes a clutch housing 22 having an internal surface 24 that defines an inner cavity 26. The inner cavity 26 is thus disposed within the clutch housing 22 and may have a variety of different shapes. By way of example and without limitation, the inner cavity 26 of the clutch housing 22 may have a cylindrical shape. A shaft 28 is disposed co-axially within the inner cavity 26 of the clutch housing 22. The shaft 28 extends along and operably rotates about a longitudinal axis 30. As such, it should be appreciated that the term "longitudinally", as used herein, refers to movement in a direction that is substantially parallel with the longitudinal axis 30. The shaft 28 presents an outer surface 32 that may also be cylindrical in shape. A clutch pack 34 is disposed radially between the clutch housing 22 and the shaft 28. The clutch pack 34 selectively couples rotation of the clutch housing 22 and the shaft 28, as will be explained in greater detail below. The clutch pack 34 generally has a first end 36 and a second end 38 opposite the first end 36 that is longitudinally spaced from the first end 36.

A first actuator 40 is disposed adjacent the first end 36 of the clutch pack 34. The first actuator 40 operably switches the clutch pack 34 between an open state and a closed state. In the open state, the first actuator 40 does not apply pressure to the clutch pack 34. In the closed state, the first actuator 40 selectively applies a predetermined pressure 42 to the first end 36 of the clutch pack 34 to force the first end 36 of the clutch pack 34 toward the second end 38 of the clutch pack 34. In other words, the first actuator 40 longitudinally compresses the clutch pack 34 to switch the clutch pack 34 to the closed state.

The clutch pack 34 includes a primary backing plate 44 disposed at the second end 38 of the clutch pack 34. The primary backing plate 44 is rotatably coupled with the clutch housing 22 such that the primary backing plate 44 rotates with the clutch housing 22. The primary backing plate 44 is retained on the clutch housing 22 such that the primary backing plate 44 cannot move longitudinally relative to the clutch housing 22 beyond a predetermined limit 46. In the example shown in FIGS. 1-3, the primary backing plate 44 is retained on the clutch housing 22 such that the primary backing plate 44 is limited from moving to the right beyond the predetermined limit 46. Accordingly, the primary backing plate 44 acts as a stop at the second end 38 of the clutch pack 34 such that the first end 36 of the clutch pack 34 moves relative to the primary backing plate 44 when the clutch pack 34 is switched between the open state and the closed state by the first actuator 40. Although the primary backing plate 44 may have a variety of different shapes, the primary backing plate 44 may have an annular shape. The primary backing plate 44 may also include a first primary backing plate side 48 and a second primary backing plate side 50 that is longitudinally spaced from the first primary backing plate side 48 by a first thickness 52.

The clutch pack 34 also includes a reaction plate 54 disposed at the first end 36 of the clutch pack 34. The reaction plate 54 is rotatably coupled with the clutch housing 22 such that the reaction plate 54 rotates with the clutch housing 22. Although the reaction plate 54 may have a variety of different shapes, the reaction plate 54 may have an annular shape. Additionally, the reaction plate 54 may include a first reaction plate side 56 and a second reaction plate side 58 that is longitudinally spaced from the first reaction plate side 56 by a second thickness 60. While other configurations are possible, the second thickness 60 of the reaction plate 54 may be less than the first thickness 52 of the primary backing plate 44. In other words, the primary backing plate 44 may have a thicker construction than the reaction plate 54. The reaction plate 54 is acted on by the first actuator 40 when the first actuator 40 switches the clutch pack 34 to the closed state. Specifically, the first actuator 40 applies the predetermined pressure 42 to the first reaction plate side 56 to force the reaction plate 54 longitudinally toward the primary backing plate 44. This action moves the reaction plate 54 in a direction that is parallel with the longitudinal axis 30 and compresses the clutch pack 34.

The clutch pack 34 additionally includes at least a first friction plate 62 and a second friction plate 64 that are disposed adjacent to one another and between the primary backing plate 44 and the reaction plate 54. The first friction plate 62 and the second friction plate 64 are rotatably coupled with the shaft 28 such that the first and second friction plates 62, 64 rotate with the shaft 28. Although the first and second friction plates 62, 64 may have a variety of different shapes, the first and second friction plates 62, 64 may each have an annular shape. Each of the first and second friction plates 62, 64 may also include a first side 66 and a second side 68 that is longitudinally spaced from the first side 66 by a third thickness 70. While other configurations are possible, the third thickness 70 of each of the first and second friction plates 62, 64 may be less than the first thickness 52 of the primary backing plate 44. In other words, the primary backing plate 44 may have a thicker construction than the first and second friction plates 62, 64. Of course in other configurations, the first and second friction plates 62, 64 may have different thicknesses. As previously explained, the first actuator 40 switches the clutch pack 34 to the closed state by moving the reaction plate 54 longitudinally toward the primary backing plate 44. As the reaction plate 54 moves towards the primary backing plate 44, the reaction plate 54 pushes the first and second friction plates 62, 64 longitudinally toward the primary backing plate 44. Because the primary backing plate 44 is prevented from moving longitudinally beyond the predetermined limit 46, the first and second friction plates 62, 64 are squeezed between the reaction plate 54 and the primary backing plate 44 as the first actuator 40 pushes the reaction plate 54 towards the primary backing plate 44, thus longitudinally compressing the clutch pack 34.

The first and second friction plates 62, 64 each include a friction surface 72 disposed on at least one of the first side 66 and the second side 68. The friction surface 72 transfers torque between the first and second friction plates 62, 64 and at least one of the reaction plate 54 and the primary backing plate 44 when the clutch pack 34 is compressed by the first actuator 40 to rotatably couple the clutch housing 22 and the shaft 28. As illustrated in FIGS. 1-3, the friction surface 72 may be disposed on the first and second sides 66, 68 of both the first and second friction plates 62, 64. In this configuration, rotation of shaft 28 drives rotation of the first and second friction plates 62, 64. When the clutch pack 34 is longitudinally compressed by the first actuator 40, the friction surfaces 72 of the first and second friction plates 62, 64 contact the second reaction plate side 58 and the first primary backing plate side 48 to transmit torque to the reaction plate 54 and the primary backing plate 44. The torque transmission provided by the friction surface 72 drives rotation of the clutch housing 22 when the clutch housing 22 is free to rotate. When the multi-level torque clutch assembly 20 is used as a brake, the clutch housing 22 is fixed (i.e. held stationary) and the torque transmission provided by the friction surface 72 acts to brake (i.e. slow) the shaft 28. When the multi-level torque clutch assembly 20 is used as a brake, the clutch housing 22 may be fixed to or integrally formed with the transmission case. Such configurations are sometimes referred to as a stationary clutch. It should also be appreciated that more than two friction plates 62, 64 may be used without departing from the scope of the subject disclosure.

As previously noted, the reaction plate 54 and the primary backing plate 44 in FIGS. 1-3 are rotatably coupled to the clutch housing 22. Although the structure that rotatably couples the reaction plate 54 and the primary backing plate 44 to the clutch housing 22 may vary, this structure may include a first plurality of splines 74 that are disposed along the internal surface 24 of the clutch housing 22. As shown in FIGS. 1-3, the first plurality of splines 74 extend parallel to the longitudinal axis 30 and engage the primary backing plate 44 and the reaction plate 54 to rotatably couple the clutch housing 22 with the primary backing plate 44 and the reaction plate 54. Accordingly, the primary backing plate 44 and the reaction plate 54 rotate with the clutch housing 22 while still being able to move longitudinally relative to the clutch housing 22, at least to a certain extent. The above disclosure also explains that the first and second friction plates 62, 64 in FIGS. 1-3 are rotatably coupled to the shaft 28. Although the structure that rotatably couples the first and second friction plates 62, 64 to the shaft 28 may vary, this structure may include a second plurality of splines 76 that are disposed along the outer surface 32 of the shaft 28. The second plurality of splines 76 extend parallel to the longitudinal axis 30 and engage the first and second friction plates 62, 64 to rotatably couple the shaft 28 with the first and second friction plates 62, 64. Accordingly, the first and second friction plates 62, 64 rotate with the shaft 28 while still being able to move longitudinally relative to the shaft 28, at least to a certain extent. Other types of connections between the reaction plate 54, the primary backing plate 44, the first and second friction plates 62, 64, the clutch housing 22, and the shaft 28 may be used without departing from the scope of the subject disclosure.

The above disclosure additionally explains that the primary backing plate 44 is retained on the clutch housing 22 such that it cannot move longitudinally beyond a predetermined limit 46. This predetermined limit 46 may be measured relative to the reaction plate 54 such that the primary backing plate 44 can only move so far away from the reaction plate 54 before it is stopped. Although the structure that stops the primary backing plate 44 at the predetermined limit 46 may vary, in the configuration shown in FIGS. 1-3, this structure includes a retainer ring 78. The clutch housing 22 has a retainer groove 80 that extends annularly about the inner cavity 26 and radially into the clutch housing 22 from the internal surface 24. The retainer ring 78 is received in the retainer groove 80. The retainer ring 78 projects into the inner cavity 26 from the retainer groove 80 to abut the first primary backing plate side 48. The retainer ring 78 therefore defines the predetermined limit 46 such that the retainer ring 78 prevents the primary backing plate 44 from moving longitudinally beyond the predetermined limit 46 in a direction moving away from the reaction plate 54. Stated another way, the retainer ring 78 illustrated in FIGS. 1-3 prevents the primary backing plate 44 from moving longitudinally to the right past the predetermined limit 46 set by the retainer ring 78 and the retainer groove 80. Other types of the structure may be used for retaining the primary backing plate 44 longitudinally on the clutch housing 22. By way of example and without limitation, the primary backing plate 44 may be fixed to the clutch housing 22 such that the primary backing plate 44 cannot move longitudinally with respect to the clutch housing 22 in either direction.

Depending upon different power flows through the transmission and different levels of torque multiplication occurring before the multi-level torque clutch assembly 20 (i.e. torque multiplication occurring at one or more locations positioned between the engine and the multi-level torque clutch assembly 20), different torque transmission values through the multi-level torque clutch assembly 20 may be desirable. Traditionally, different torque transmission values transmitted through clutch assemblies are achieved by varying the predetermined pressure 42 that the first actuator 40 applies to the first reaction plate side 56. Essentially, by varying the clamping (i.e. squeezing) force applied to the first and second friction plates 62, 64 by the reaction plate 54 and the primary backing plate 44, different torque transmission values can be achieved by increasing or decreasing the amount of slip between the first and second friction plates 62, 64, the reaction plate 54, and the primary backing plate 44. This option has its drawbacks however, since the friction surface 72 of the first and second friction plates 62, 64 are typically torque sensitive in only a very narrow range of applied pressure. Accordingly, it is difficult to produce a clutch assembly that is effective at both high and low torque transmission values. By way of example and without limitation, the friction surface 72 may have an optimum applied pressure value of 2 megapascal (Mpa). The torque sensitivity of the friction surface 72 would likely be such that an applied pressure of 0.5 megapascal (Mpa) would be too low and an applied pressure of 6 megapascal (Mpa) would be too great to achieve proper clutch control and calibration. Accordingly, the predetermined pressure 42 that the first actuator 40 applies to the reaction plate 54 can only be varied so much before clutch operation suffers.

Rather than varying the pressure that the first actuator 40 applies to the reaction plate 54, the disclosed multi-level torque clutch assembly 20 provides another option. The multi-level torque clutch assembly 20 is equipped with a secondary backing plate 82 that is selectively engaged to change the number of friction plates 62, 64 that transfer torque between the shaft 28 and the clutch housing 22. Still referring to FIGS. 1-3, the secondary backing plate 82 is part of the clutch pack 34 and is disposed between the first friction plate 62 and second friction plate 64. It should be appreciated that where more than two friction plates 62, 64 are included, the secondary backing plate 82 is simply disposed between at least two of the multiple friction plates 62, 64 such that the secondary backing plate 82 can bypass (i.e. isolate) at least one of the friction plates 62, 64 when the secondary backing plate 82 is engaged. The secondary backing plate 82 is rotatably coupled with the clutch housing 22 such that the secondary backing plate 82 rotates with the clutch housing 22. Although other types of connections are possible, in FIGS. 1-3, the secondary backing plate 82 engages the first plurality of splines 74 located on the internal surface 24 of the clutch housing 22. Similarly, while other shapes are possible, the secondary backing plate 82 may have an annular shape and may include a first secondary backing plate side 84 and a second secondary backing plate side 86 that is longitudinally spaced from the first secondary backing plate side 84 by a fourth thickness 88. In some configurations, such as that shown in FIGS. 1-3, the fourth thickness 88 of the secondary backing plate 82 is greater than the first thickness 52 of the primary backing plate 44. In other words, the secondary backing plate 82 may have a thicker construction when compared to the primary backing plate 44.

The multi-level torque clutch assembly 20 also includes a second actuator 90 that is disposed adjacent the secondary backing plate 82. The second actuator 90 selectively switches the clutch pack 34 between a low torque state (FIG. 3) and a high torque state (FIG. 2). In the low torque state, the second actuator 90 prevents the secondary backing plate 82 from moving longitudinally toward the primary backing plate 44 beyond a locked position 92. Accordingly, in the low torque state, the first friction plate 62 is squeezed between the reaction plate 54 and the secondary backing plate 82 when the predetermined pressure 42 is applied to the reaction plate 54. The secondary backing plate 82 bypasses (i.e. isolates) the second friction plate 64 such that the second friction plate 64 is not pressed against the primary backing plate 44 when the predetermined pressure 42 is applied to the reaction plate 54. In the high torque state, the second actuator 90 permits longitudinal movement of the secondary backing plate 82 toward the primary backing plate 44 beyond the locked position 92 such that the secondary backing plate 82 and the first and second friction plates 62, 64 are squeezed between the reaction plate 54 and the primary backing plate 44 when the predetermined pressure 42 is applied to the reaction plate 54.

The second actuator 90 may include a locking member 94 that selectively moves between a retracted position and an extended position. When the second actuator 90 switches the clutch pack 34 to the high torque state, the locking member 94 is moved to the refracted position, where the locking member 94 is retracted from the inner cavity 26 of the clutch housing 22. When the second actuator 90 switches the clutch pack 34 to the low torque state, the locking member 94 is moved to the extended position, where the locking member 94 extends into the inner cavity 26 of the clutch housing 22 to engage the secondary backing plate 82. Thus, in the extended position, the locking member 94 of the second actuator 90 prevents the secondary backing plate 82 from moving longitudinally toward the primary backing plate 44 beyond the locked position 92. Although a variety of different types of actuators may be used for the first and second actuators 40, 90, by way of example and without limitation, the first and second actuators 40, 90 may be hydraulic actuators. Also, the second actuator 90 may optionally include a return spring 96 (e.g., a tensile spring) that biases the locking member 94 to the retracted position. The return spring 96 thus provides a mechanism that sets the clutch pack 34 in the high torque state by default.

As illustrated in FIGS. 1-3, the second actuator 90 may be disposed in the clutch housing 22 such that the locking member 94 projects from the internal surface 24 of the clutch housing 22 in the extended position and is retracted within the clutch housing 22 in the refracted position. Where the multi-level torque clutch assembly 20 acts as a brake (i.e. is a stationary clutch), the second actuator 90 may be disposed in or may extend through the transmission case. The secondary backing plate 82 may have a recess 98 that operably receives the locking member 94 when the second actuator 90 moves the locking member 94 to the extended position to longitudinally fix the secondary backing plate 82 in place relative to the primary backing plate 44.

FIG. 1 illustrates the multi-level torque clutch assembly 20 in the open state. The first actuator 40 is not applying the predetermined pressure 42 to the reaction plate 54 so the clutch pack 34 remains uncompressed. The first and second friction plates 62, 64 are not squeezed between the reaction plate 54 and the primary backing plate 44 or between the reaction plate 54 and the secondary backing plate 82. Accordingly, there is no torque being transmitted between the clutch housing 22 and the shaft 28. In other words, the shaft 28 can rotate freely relative to the clutch housing 22 and vice versa.

In FIG. 2, the multi-level torque clutch assembly 20 is shown in the closed state. At the same time the clutch pack 34 is in the high torque state, where the second actuator 90 has positioned the locking member 94 in the retracted position. As a result, the secondary backing plate 82 is permitted to travel longitudinally towards the primary backing plate 44 beyond the locked position 92 in response to the first actuator 40 applying the predetermined pressure 42 to the reaction plate 54. The first friction plate 62, the secondary backing plate 82, and the second friction plate 64 are squeezed between the reaction plate 54 and the primary backing plate 44 such that the friction surfaces 72 of the first friction plate 62 contact the second reaction plate side 58 and the first secondary backing plate side 84. At the same time, the friction surfaces 72 of the second friction plate 64 contact the second secondary backing plate side 86 and the first primary backing plate side 48. A high torque transmission value is achieved through the multi-level torque clutch assembly 20 because the friction surfaces 72 of both the first and second friction plates 62, 64 are engaged.

In FIG. 3, the multi-level torque clutch assembly 20 is again shown in the closed state, but the clutch pack 34 has been switched to the low torque state. The second actuator 90 has now positioned the locking member 94 in the extended position. The locking member 94 is received in the recess 98 of the secondary backing plate 82 locking the secondary backing plate 82 in place in the locked position 92. The locking member 94 does not allow the secondary backing plate 82 to move longitudinally toward the primary backing plate 44. Only the first friction plate 62 is squeezed between the reaction plate 54 and the secondary backing plate 82 such that the friction surfaces 72 of only the first friction plate 62 contact the second reaction plate side 58 and the first secondary backing plate side 84. The secondary backing plate 82, in the locked position 92, isolates the second friction plate 64 from the predetermined pressure 42 that the first actuator 40 applies to the reaction plate 54. As a result, the friction surfaces 72 of the second friction plate 64 are not pressed against the second secondary backing plate side 86 and the first primary backing plate side 48. A low torque transmission value is achieved through the multi-level torque clutch assembly 20 because the friction surfaces 72 of only the first friction plates 62 are engaged.

Accordingly, the disclosed multi-level torque clutch assembly 20 provides two different torque transmission values through the multi-level torque clutch assembly 20 without varying the predetermined pressure 42 that the first actuator 40 applies to the reaction plate 54. Advantageously, the predetermined pressure 42 can be maintained at the optimum value for the friction surfaces 72 while high and low torque transmission values are provided by selectively isolating one or more of the friction plates 62, 64 by locking the secondary backing plate 82 in the locked position 92. This provides for better clutch control and easier calibration, particularly when a large difference between the high and low torque transmission values is desired.

Figure 4:
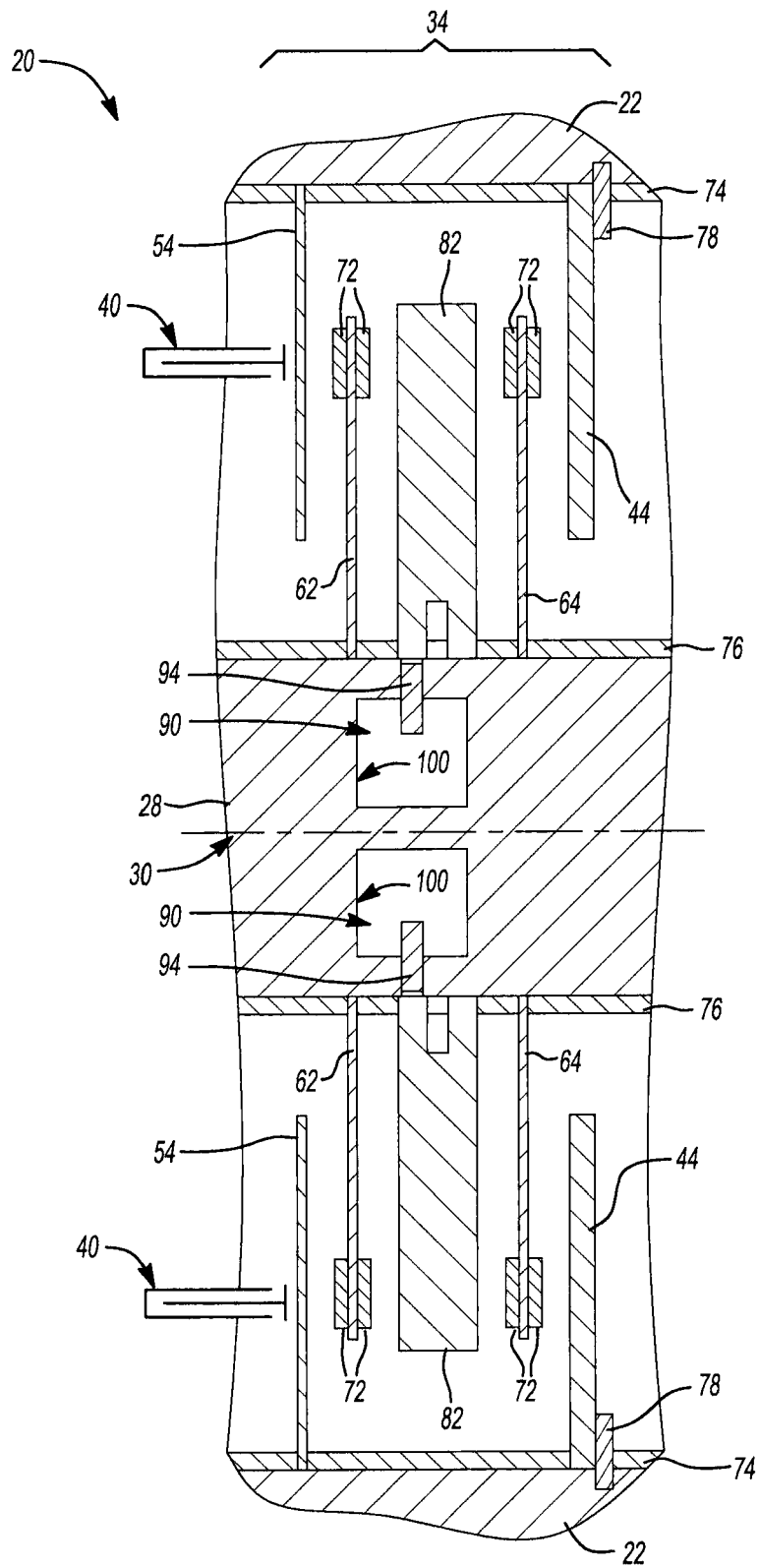
FIG. 4 is a partial, cross-sectional view of another exemplary multi-level torque clutch assembly constructed in accordance with the subject disclosure where the multi-level torque clutch assembly is shown in the open state.
Figure 5:
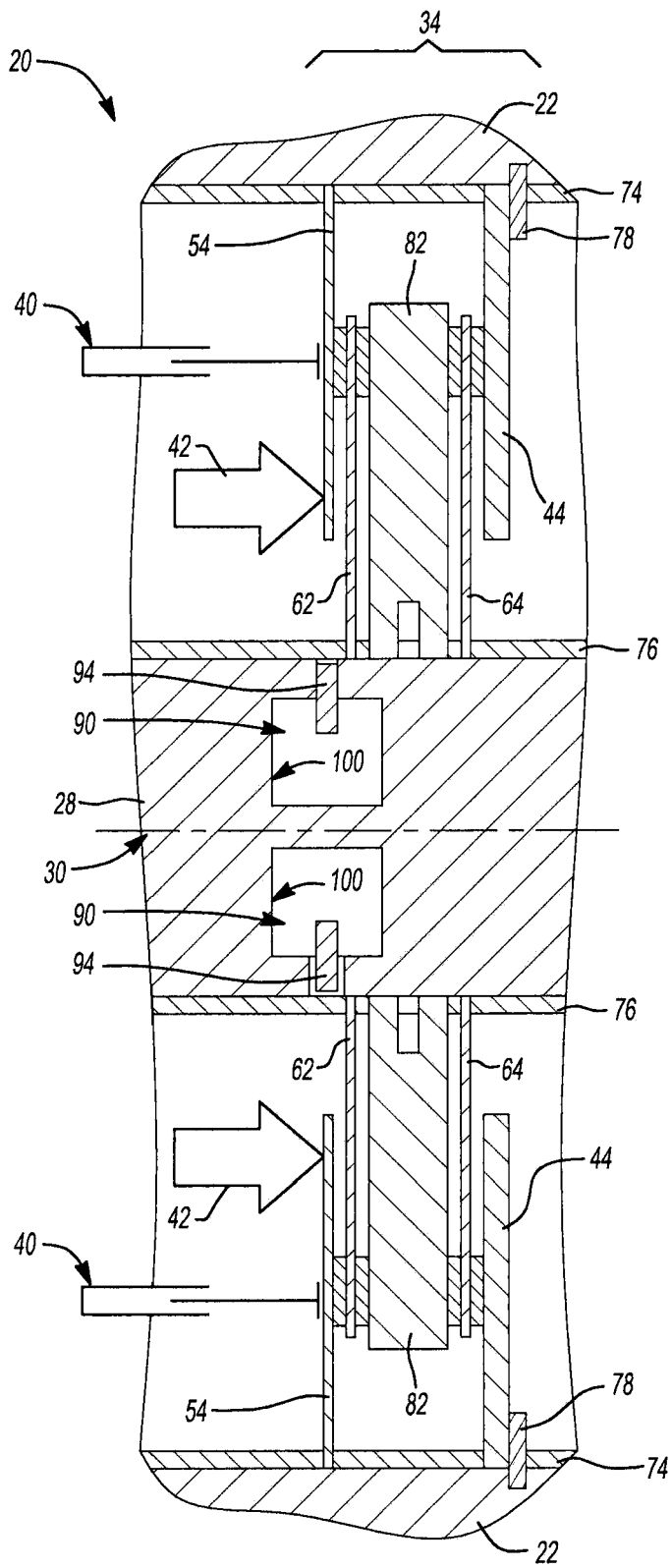
FIG. 5 is a partial, cross-sectional view of the multi-level torque clutch assembly of FIG. 4 where the multi-level torque clutch assembly is shown in the closed state with the secondary backing plate disengaged.
Figure 6:
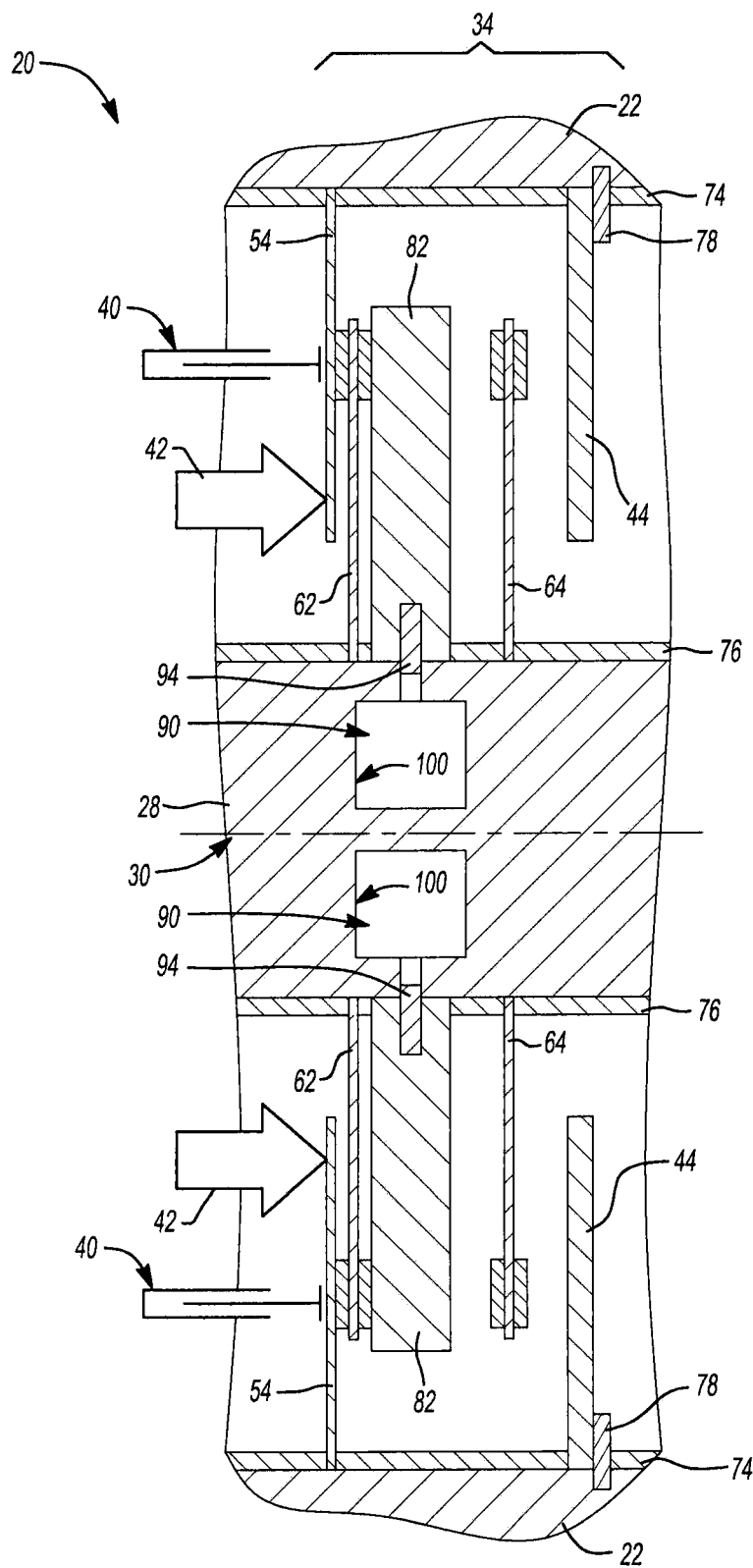
FIG. 6 is a partial, cross-sectional view of the multi-level torque clutch assembly of FIG. 4 where the multi-level torque clutch assembly is shown in the closed state with the secondary backing plate engaged in the locked position.

As shown in FIGS. 4-6, the second actuator 90 may alternatively be disposed in the shaft 28 such that the locking member 94 projects from the outer surface 32 of the shaft 28 in the extended position and is retracted within the shaft 28 in said retracted position. In this configuration, the shaft 28 may be hollow or partially hollow, presenting an inner surface 100. The second actuator 90 may be connected to the inner surface 100 of the shaft 28 or may be at least partially defined by the inner surface 100 of the shaft 28. The mounting point of the secondary backing plate 82 may be reversed in this configuration. Instead of engaging the first plurality of splines 74 on the internal surface 24 of the clutch housing 22 like in FIGS. 1-3, the secondary backing plate 82 in FIGS. 4-6 engages the second plurality of splines 76 on the external surface of the shaft 28. Accordingly, the secondary backing plate 82 in FIG. 4-6 is rotatably coupled to the shaft 28 such that the secondary backing plate 82 rotates with the shaft 28. When the locking member 94 of the second actuator 90 is in the retracted position, the secondary backing plate 82 is free to move longitudinally along the shaft 28. When the locking member 94 of the second actuator 90 is in the extended position, the secondary backing plate 82 is fixed in place on the shaft 28 in the locked position 92. Otherwise, operation of the multi-level torque clutch assembly 20 illustrated in FIGS. 4-6 is the same as that described above for the multi-level torque clutch assembly 20 illustrated in FIGS. 1-3.

Figure 7:
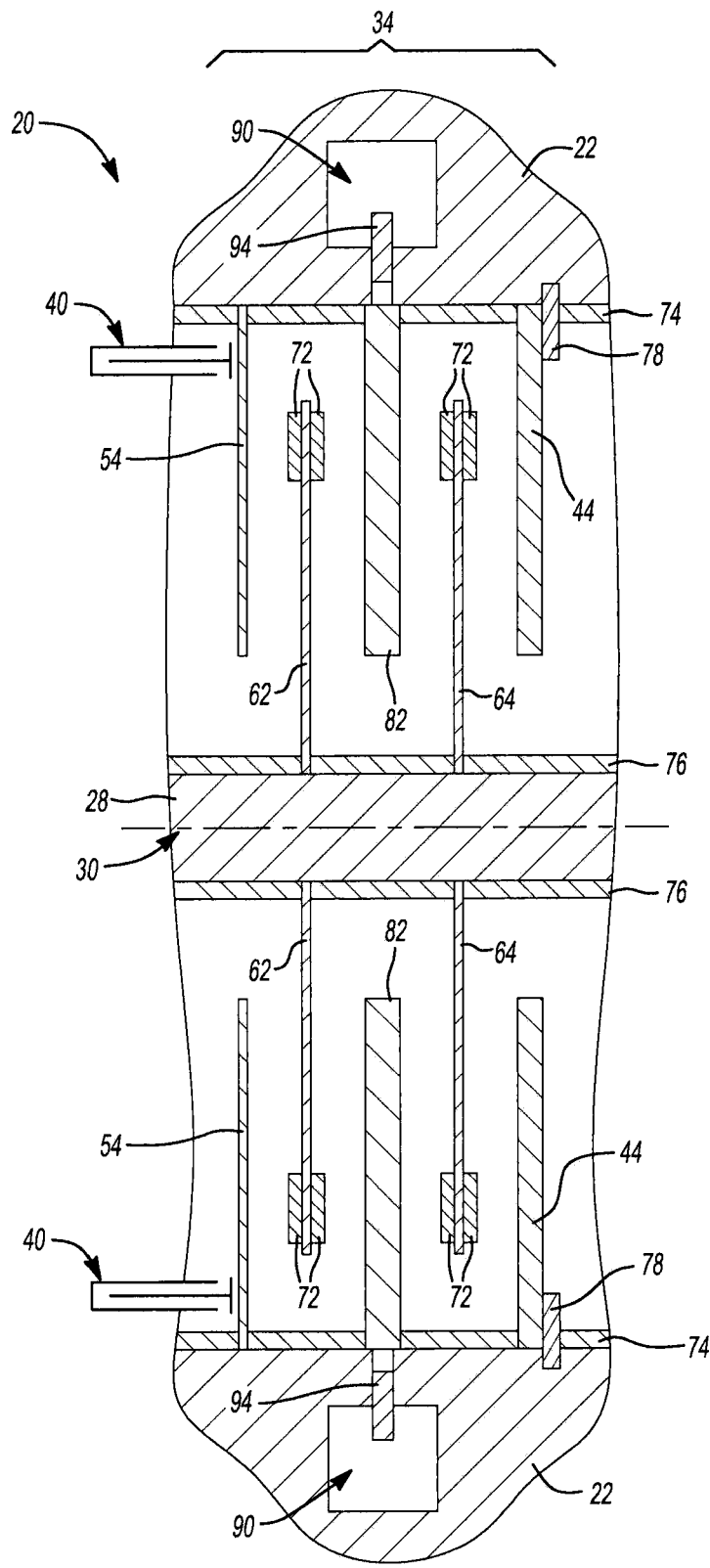
FIG. 7 is a partial, cross-sectional view of another exemplary multi-level torque clutch assembly constructed in accordance with the subject disclosure where the multi-level torque clutch assembly is shown in the open state.
Figure 8:
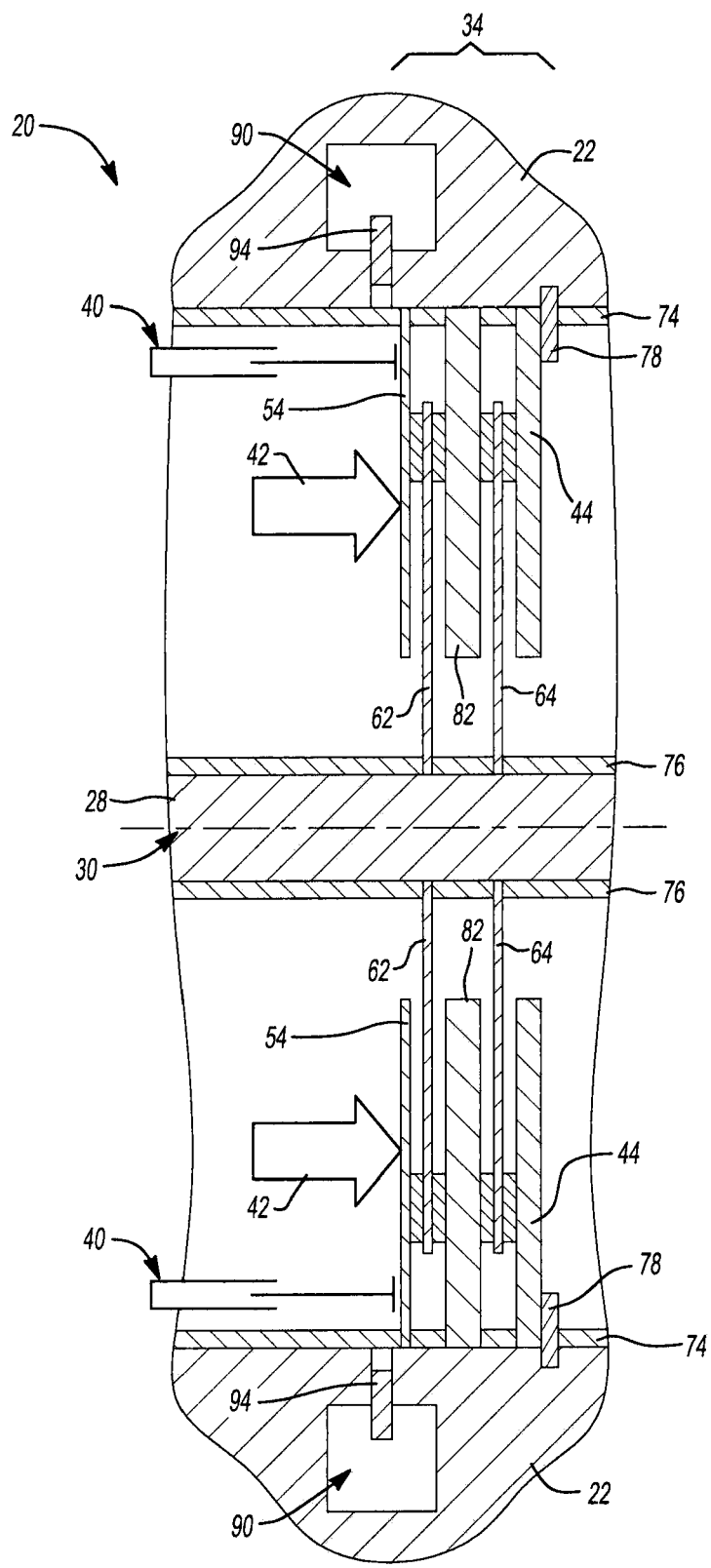
FIG. 8 is a partial, cross-sectional view of the multi-level torque clutch assembly of FIG. 7 where the multi-level torque clutch assembly is shown in the closed state with the secondary backing plate disengaged.
Figure 9:
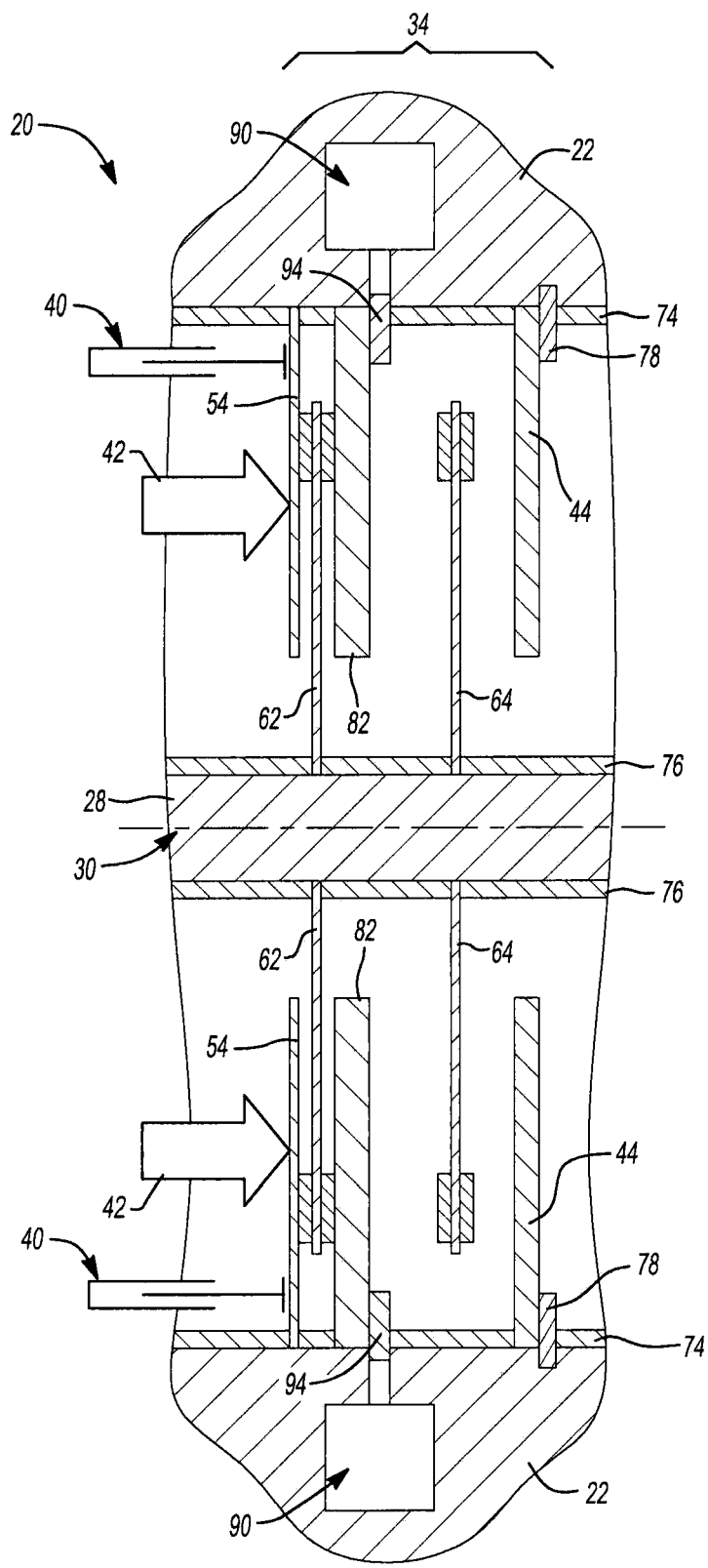
FIG. 9 is a partial, cross-sectional view of the multi-level torque clutch assembly of FIG. 7 where the multi-level torque clutch assembly is shown in the closed state with the secondary backing plate engaged in the locked position.

As shown in FIGS. 7-9, another alternative configuration is illustrated where the locking member 94 abuts the second secondary backing plate side 86 when the second actuator 90 moves the locking member 94 to the extended position such that the locking member 94 acts as a stop to maintain a predetermined distance between the secondary backing plate 82 and the primary backing plate 44. In this configuration, the secondary backing plate 82 does not include the recess 98 illustrated in FIGS. 1-3 and 4-6. Accordingly, the fourth thickness of the secondary backing plate 82 may be greater than, equal to, or less than the first thickness 52 of the primary backing plate 44 since the secondary backing plate 82 does not need to be wide enough to accommodate the locking member 94 in the recess 98. It should also be appreciated the even when the locking member 94 in FIGS. 7-9 is moved to the extended position, the secondary backing plate 82 can move longitudinally toward the first friction plate 62. In the extended position, the locking member 94 of the second actuator 90 only prevents the secondary backing plate 82 from moving longitudinally towards the primary backing plate 44 beyond the locked position 92 (i.e. beyond the location of the locking member 94). Otherwise, operation of the multi-level torque clutch assembly 20 illustrated in FIGS. 7-9 is the same as that described above for the multi-level torque clutch assembly 20 illustrated in FIGS. 1-3.

Figure 10:
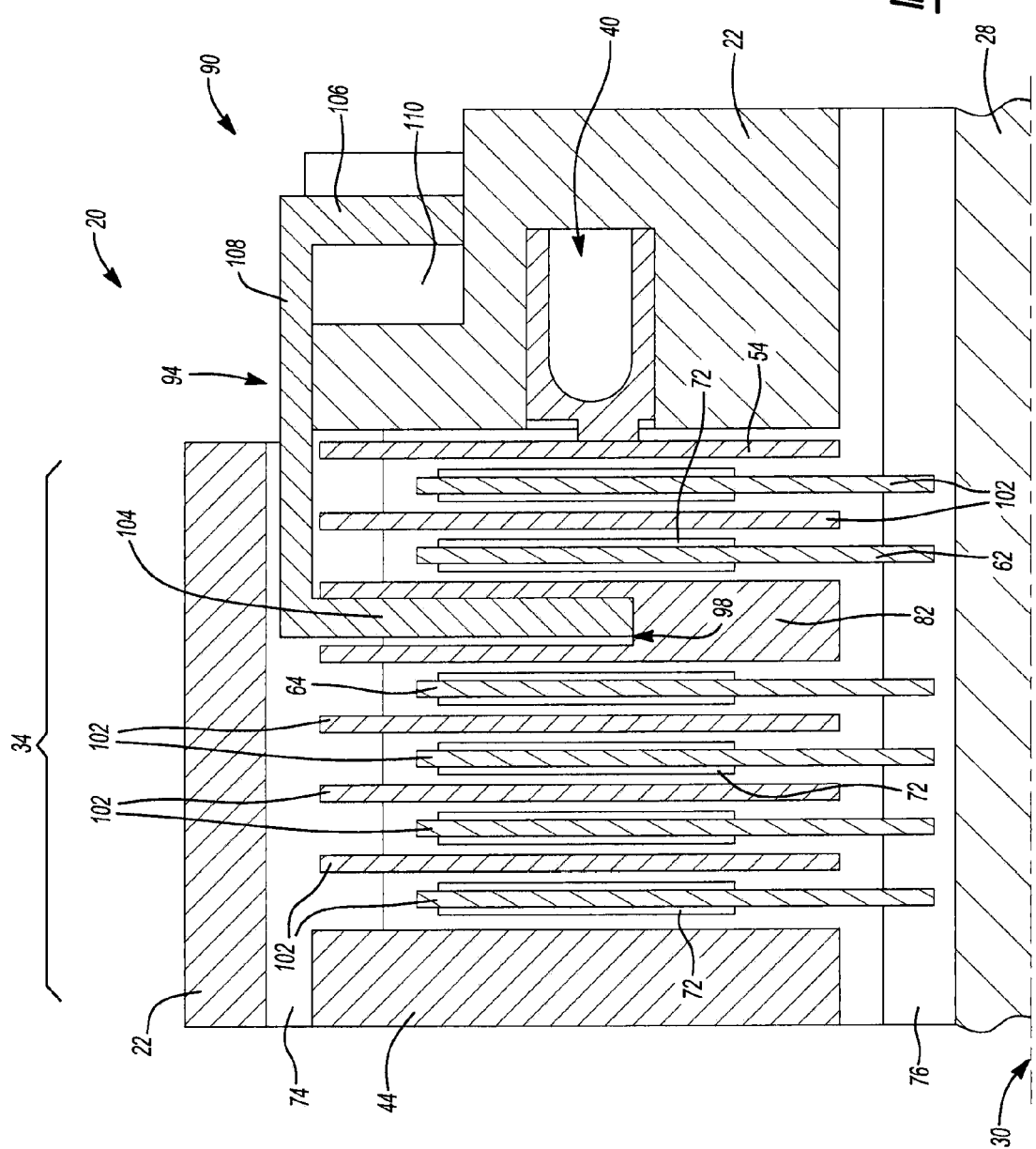
FIG. 10 is a partial, cross-sectional view of another exemplary multi-level torque clutch assembly constructed in accordance with the subject disclosure where the multi-level torque clutch assembly is shown in the open state.
Figure 11:
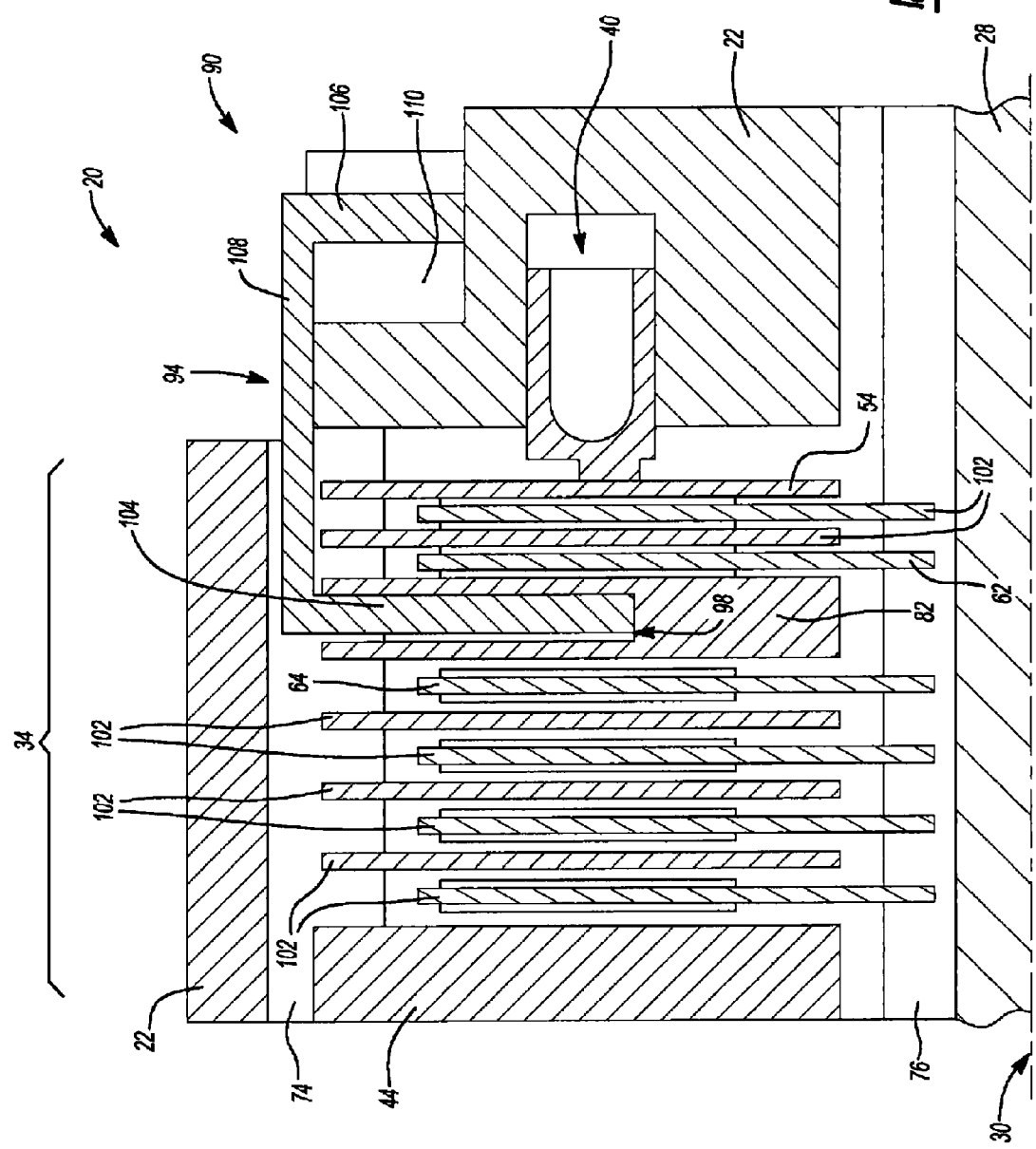
FIG. 11 is a partial, cross-sectional view of the multi-level torque clutch assembly of FIG. 10 where the multi-level torque clutch assembly is shown in the closed state with the secondary backing plate engaged in the locked position.
Figure 12:
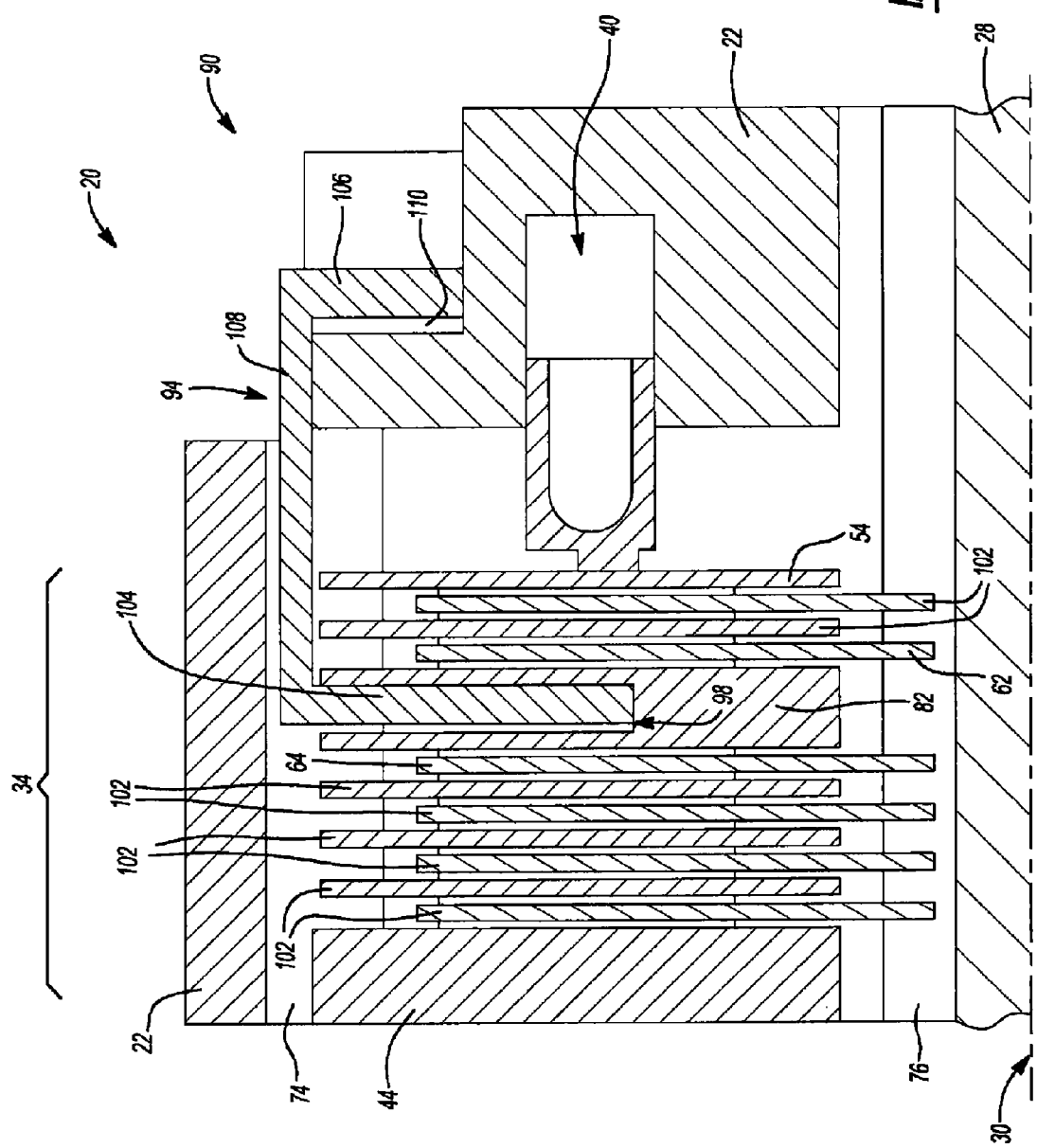
FIG. 12 is a partial, cross-sectional view of the multi-level torque clutch assembly of FIG. 10 where the multi-level torque clutch assembly is shown in the closed state with the secondary backing plate disengaged.

As shown in FIGS. 10-12, another alternative configuration is illustrated where the locking member 94 extends in a U-shape. The secondary backing plate 82 is disposed between the first friction plate 62 and the second friction plate 64. Further, a plurality of additional friction plates 102 are illustrated, both between the first friction plate 62 and the reaction plate 54 and between the second friction plate 64 and the primary backing plate 44. In accordance with this configuration, the plurality of additional friction plates 102 are rotatably coupled to the clutch housing 22 and the shaft 28 in a sequentially alternating arrangement. Some, none, or all of the additional friction plates 102 may be equipped with one or more friction surfaces 72. In FIGS. 10-12, the clutch housing 22 extends inwardly adjacent the reaction plate 54 and houses both the first actuator 40 and the second actuator 90. The secondary backing plate 82 includes recess 98, which permanently receives a first leg 104 of the locking member 94. The locking member 94 further includes a second leg 106 that is longitudinally spaced from the first leg 104. The first leg 104 and the second leg 106 are connected by a bridging portion 108. Further, the first leg 104 and the second leg 108 may be transverse to the bridging portion 108, giving the locking member 94 the aforesaid U-shape. The bridging portion 108 of the locking member 94 may extend parallel to the longitudinal axis 30 and between the clutch housing 22 and the reaction plate 54. The second leg 108 of the locking member 94 is received in an actuator cavity 110. The actuator cavity 110 is part of the second actuator 90 and is defined by the clutch housing 22.

FIG. 10 illustrates the multi-level torque clutch assembly 20 where the clutch pack 34 is in the open state. Accordingly, the first actuator 40 is not applying pressure to the reaction plate 54. FIG. 11 illustrates the multi-level torque clutch assembly 20 where the clutch pack 34 is in the closed state and where the second actuator 90 has switched the clutch pack 34 to the low torque state. The actuator cavity 110 in FIG. 11 has been filled with fluid, preventing the second leg 106 of the locking member 94 from moving longitudinally toward the primary backing plate 44. Because the first leg 104 is permanently received in the recess 98 of the secondary backing plate 82, the secondary backing plate 82 cannot move toward the primary backing plate 44 beyond the locked position 92. Thus, only a portion of the clutch pack 34 is compressed when the first actuator 40 applies pressure to the reaction plate 54. By contrast, FIG. 12 illustrates the multi-level torque clutch assembly 20 where the clutch pack 34 is in the closed state and where the second actuator 90 has switched the clutch pack 34 to the high torque state. The actuator cavity 110 in FIG. 12 has been emptied of fluid, such that the second leg 106 of the locking member 94 is free to move longitudinally toward or away from the primary backing plate 44. Because the first leg 104 is permanently received in the recess 98 of the secondary backing plate 82, the locking member 94 moves longitudinally with the secondary backing plate 82 when the second actuator 90 has switched the clutch pack 34 to the high torque state. As shown in FIG. 12, the entire clutch pack 34 is compressed when the first actuator 40 applies pressure to the reaction plate 54 as both the secondary backing plate 82 and the locking member 94 move beyond the locked position toward the primary backing plate 44. Otherwise, operation of the multi-level torque clutch assembly 20 illustrated in FIGS. 10-12 is the same as that described above for the multi-level torque clutch assembly 20 illustrated in FIGS. 1-3.

Figure 13:
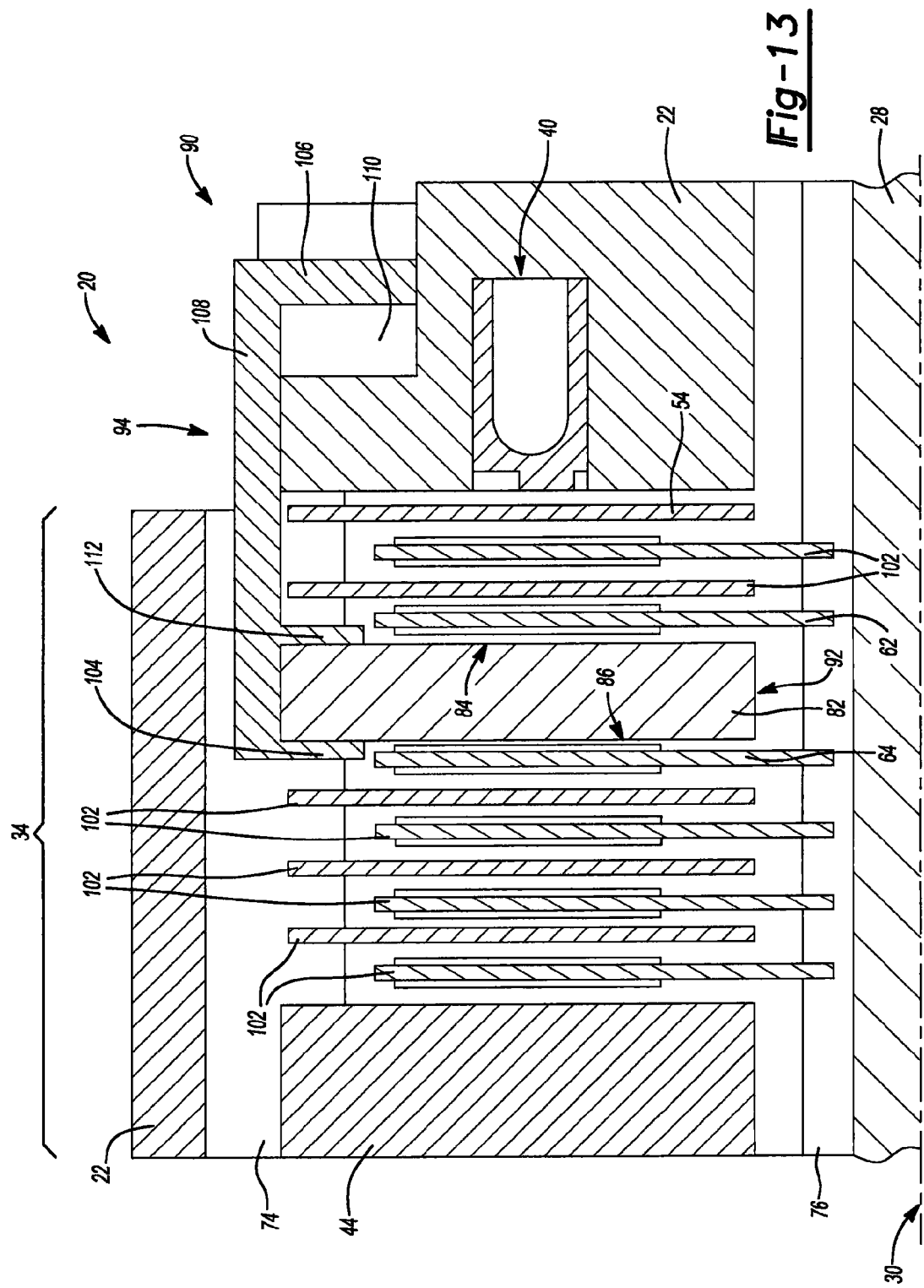
FIG. 13 is a partial, cross-sectional view of another exemplary multi-level torque clutch assembly constructed in accordance with the subject disclosure where the multi-level torque clutch assembly is shown in the open state.
Figure 14:
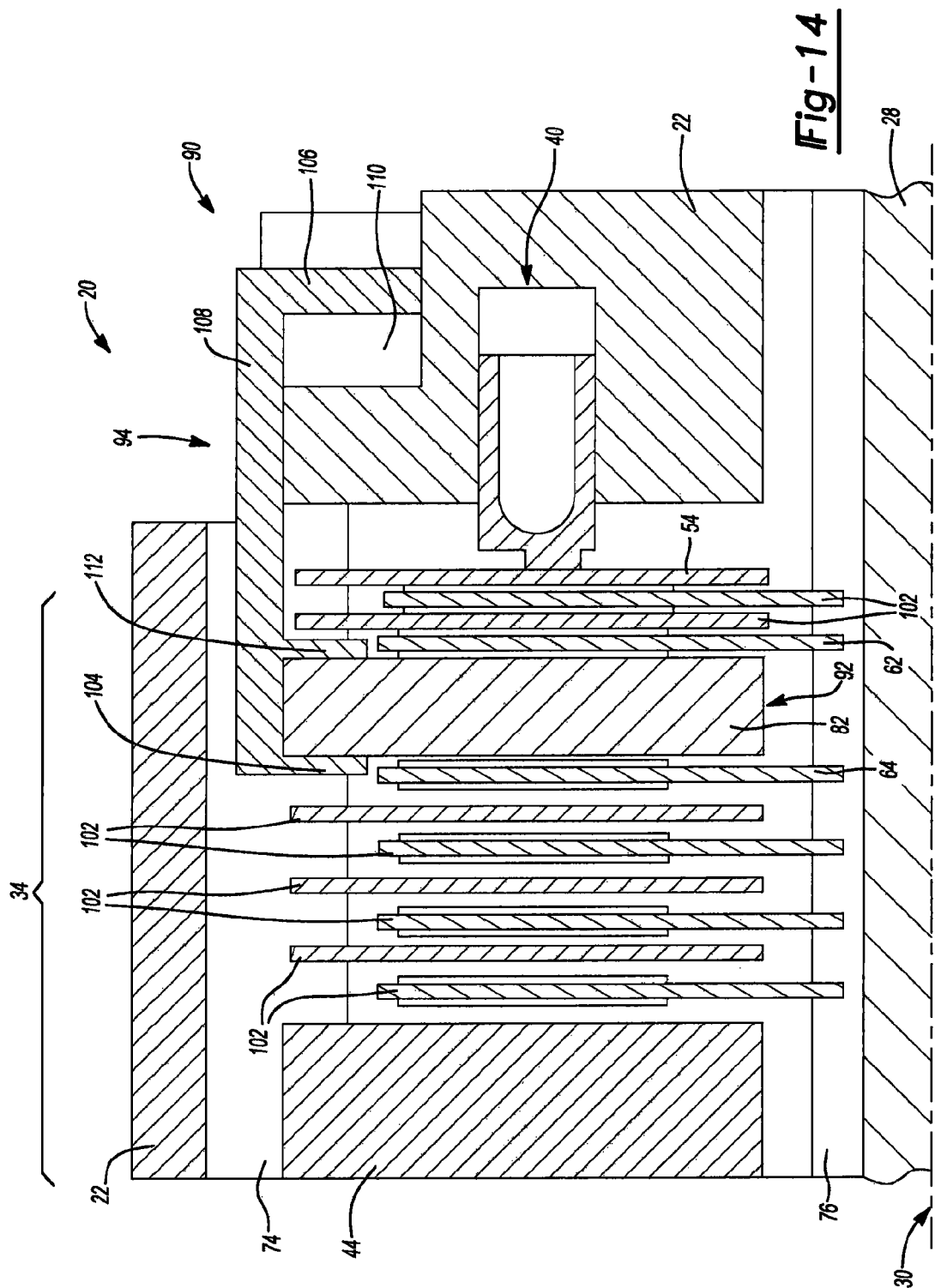
FIG. 14 is a partial, cross-sectional view of the multi-level torque clutch assembly of FIG. 13 where the multi-level torque clutch assembly is shown in the closed state with the secondary backing plate engaged in the locked position.
Figure 15:
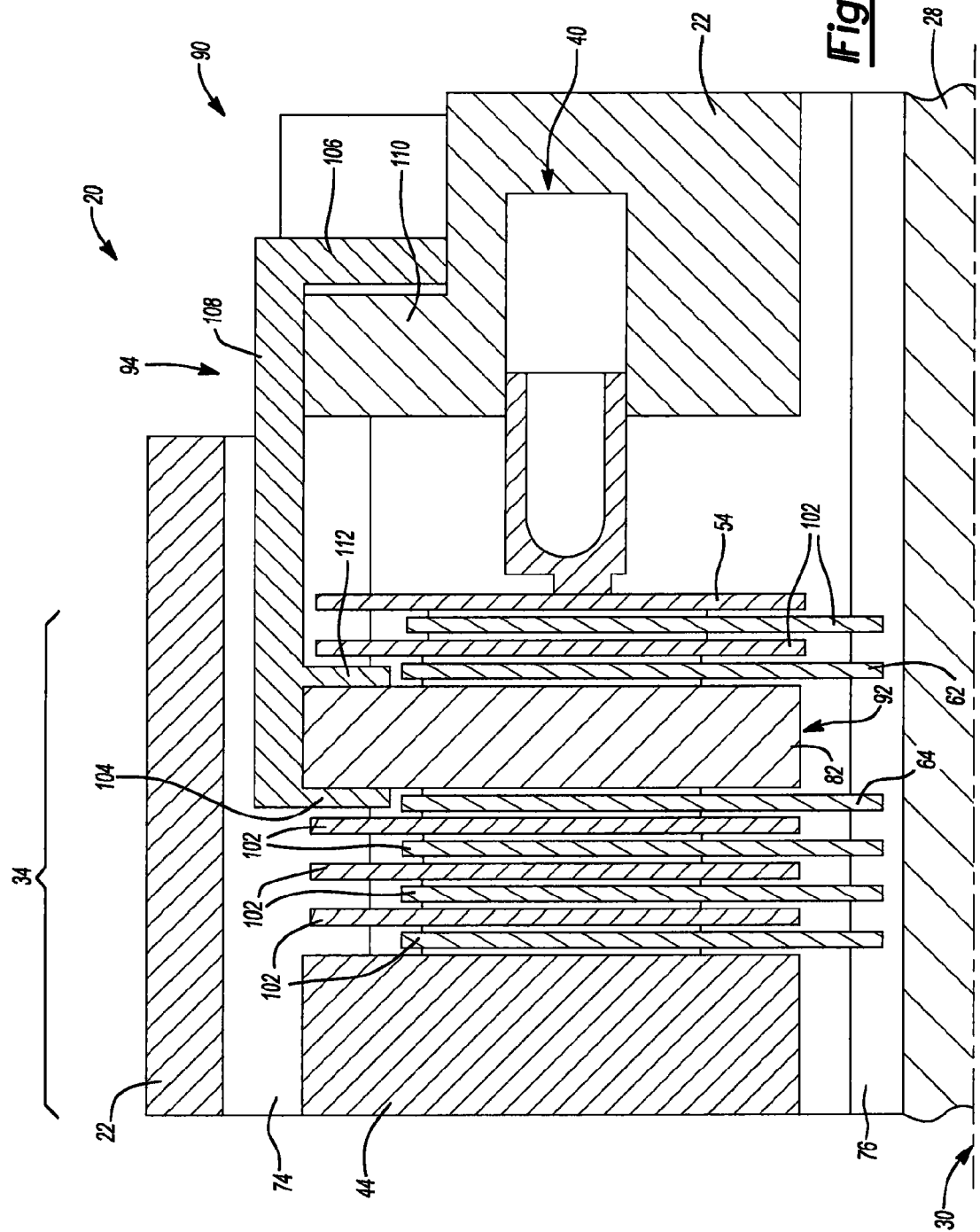
FIG. 15 is a partial, cross-sectional view of the multi-level torque clutch assembly of FIG. 13 where the multi-level torque clutch assembly is shown in the closed state with the secondary backing plate disengaged.

As shown in FIGS. 13-15, another alternative configuration is illustrated where the locking member 94 includes a third leg 112 that extends from the bridging portion 108 of the locking member 94. The third leg 112 is positioned longitudinally along the bridging portion 108 between the first leg 104 and the second leg 106. The first leg 104 and the third leg 112 are longitudinally spaced from one another by the fourth thickness 88 of the secondary backing plate 82 such that the secondary backing plate 82 is permanently received between the first leg 104 and the second leg 112 of the locking member 94. More particularly, the first leg 104 of the locking member 94 abuts the second secondary backing plate side 86 and the third leg 112 of the locking member 94 abuts the first secondary backing plate side 84. Accordingly, the first and third legs 104, 112 of the locking member 94 prevent the secondary backing plate 82 from moving toward the primary backing plate 44 beyond the locked position 92 when the second actuator 90 switches the clutch pack 34 to the low torque state (FIG. 14). Therefore, in this configuration, the secondary backing plate 82 does not include the recess 98 illustrated in FIGS. 1-3, 4-6, and 10-12.

FIG. 13 illustrates the multi-level torque clutch assembly 20 where the clutch pack 34 is in the open state. Accordingly, the first actuator 40 is not applying pressure to the reaction plate 54. FIG. 14 illustrates the multi-level torque clutch assembly 20 where the clutch pack 34 is in the closed state and where the second actuator 90 has switched the clutch pack 34 to the low torque state. The actuator cavity 110 in FIG. 14 has been filled with fluid, preventing the second leg 106 of the locking member 94 from moving longitudinally toward the primary backing plate 44. Because the secondary backing plate 82 is permanently retained between the first and third legs 104, 112 of the locking member 94, the secondary backing plate 82 cannot move toward the primary backing plate 44 beyond the locked position 92. Thus, only a portion of the clutch pack 34 is compressed when the first actuator 40 applies pressure to the reaction plate 54. By contrast, FIG. 15 illustrates the multi-level torque clutch assembly 20 where the clutch pack 34 is in the closed state and where the second actuator 90 has switched the clutch pack 34 to the high torque state. The actuator cavity 110 in FIG. 15 has been emptied of fluid, such that the second leg 106 of the locking member 94 is free to move longitudinally toward or away from the primary backing plate 44. Because the secondary backing plate 82 is permanently retained between the first and third legs 104, 112 of the locking member 94, the locking member 94 moves longitudinally with the secondary backing plate 82 when the second actuator 90 has switched the clutch pack 34 to the high torque state. As shown in FIG. 15, the entire clutch pack 34 is compressed when the first actuator 40 applies pressure to the reaction plate 54 as both the secondary backing plate 82 and the locking member 94 move beyond the locked position toward the primary backing plate 44. Otherwise, operation of the multi-level torque clutch assembly 20 illustrated in FIGS. 13-15 is the same as that described above for the multi-level torque clutch assembly 20 illustrated in FIGS. 10-12.

The configurations illustrated in FIGS. 10-15 provide several additional benefits. First, the positioning of the first and second actuators 40, 90 adjacent the reaction plate 54 reduces the packaging size of the multi-level torque clutch assembly 20. Second, the positioning of the first and second actuators 40, 90 adjacent the reaction plate 54 makes production easier because the clutch housing 22 and/or the shaft 28 do not need to be modified at areas inboard or outboard of the clutch pack 34 to accommodate the positioning of the second actuator 90 shown in FIGS. 1-9, for example. It should also be appreciated that even when the actuator cavity 110 in FIGS. 10-15 is filled with fluid, the locking member 94 and thus the secondary backing plate 82 can move longitudinally toward the first friction plate 62. When the actuator cavity 110 is filled with fluid, the locking member 94 of the second actuator 90 simply prevents the secondary backing plate 82 from moving longitudinally towards the primary backing plate 44 beyond the locked position 92. It should also be appreciated that in accordance with certain embodiments, the bridging portion 108 of the locking member 94 may extend between two splines of the first plurality of splines 74.

Various alternative configurations are possible where the reaction plate 54, the first and second friction plates 62, 64, the primary backing plate 44, and the secondary backing plate 82 are rotatably coupled to either the clutch housing 22 or the shaft 28 in different combinations. All such combination are considered to be encompassed by the scope of the subject disclosure. Additionally, it should be appreciated that the several views of the multi-level torque clutch assembly 20 in FIGS. 1-15 are partial cross-sectional views. Accordingly, the first actuator 40 may be multiple actuators that individually apply the predetermined pressure 42 to the reaction plate 54. The disclosed multi-level torque clutch assembly 20 may provide additional levels of torque transmission by varying the pressure that the first actuator 40 applies to the reaction plate 54. Under such a configuration, the first actuator 40 may include multiple actuators that apply different predetermined pressures 42 to the reaction plate 54, respectively. The second actuator 90 may be annular in shape, or may alternatively be one or more discrete actuators that are positioned about the clutch housing 22 and/or the shaft 28. Likewise, the locking member 94 of the second actuator 90 may extend annularly or may be one or more pins or U-shaped fingers that are placed at circumferentially spaced locations about the clutch pack 34. Although not shown in FIGS. 1-15, one, some, or all of the reaction plate 54, the friction plates 62, 64, the primary backing plate 44, and the secondary backing plate 82 may be biased to certain longitudinal positions that can be measured in relation to the locking member 94 of the second actuator 90. By way of example and without limitation, such biasing may be accomplished by springs, actuators, inertia, or hydraulic pressure within the inner cavity 26. It should also be appreciated that although FIGS. 1-15 illustrate wet-clutch assemblies, where the inner cavity 26 contains a fluid, the subject disclosure also applies to dry-clutch assemblies. It should also be appreciated that various combinations are possible where one or more friction surfaces 72 are provided on the primary backing plate 44, the reaction plate 54, the secondary backing plate 82, and/or on some, none, or all of the first and second friction plates 62, 64 and the additional friction plates 102.

The subject disclosure additionally provides a method of operating the multi-level torque clutch assemblies 20 described above. The method comprises the step of rotating at least one of the clutch housing 22 and the shaft 28. Because some components of the clutch pack 34 are rotatably coupled the clutch housing 22 and other components of the clutch pack 34 are rotatably coupled to the shaft 28, the method includes the step of rotating one or more components of the clutch pack 34 in response to the step of rotating at least one of the clutch housing 22 and the shaft 28. The components of the clutch pack 34 include, at the least very least, the reaction plate 54, the primary backing plate 44, the first and second friction plates 63, 64, and the secondary backing plate 82. The method also includes the steps of initiating the low torque state by preventing the secondary backing plate 82 from moving longitudinally toward the primary backing plate 44 beyond the locked position 92 and applying the predetermined pressure 42 to the reaction plate 54 to squeeze one of the first and second friction plates 62 between the reaction plate 54 and the secondary backing plate 82. In the low torque state, another one of the first and second friction plates 64 (i.e. the friction plate(s) positioned between the primary and secondary backing plates 44, 82) is isolated from the predetermined pressure 42 because the secondary backing plate 82 cannot move beyond the locked position 92 to press the other one of the first and second friction plates 64 against the primary backing plate 44. As such, the method includes the step of generating torque transfer between the clutch housing 22 and the shaft 28 using only some of the components 54, 62, 82 of the clutch pack 34 when the low torque state has been initiated.

The method further includes the steps of initiating the high torque state by allowing the secondary backing plate 82 to move longitudinally toward the primary backing plate 44 beyond the locked position 92 and applying the predetermined pressure 42 to the reaction plate 54 to squeeze both of the first and second friction plates 62, 64 and the secondary backing plate 82 between the reaction plate 54 and the primary backing plate 44. As such, the method includes the step of generating torque transfer between the clutch housing 22 and the shaft 28 using a greater number of the components 44, 54, 62, 64, 82 of the clutch pack 34 when the high torque state has been initiated in comparison to when the low torque state has been initiated. Of course it should be appreciated that the torque transfer generated between the clutch housing 22 and the shaft 28 when the low torque state has been initiated is less than the torque transfer generated between the clutch housing 22 and the shaft 28 when the high torque state has been initiated even though the predetermined pressure 42 applied to the reaction plate 54 remains the same. Accordingly, torque transmission through the clutch pack 34 can be varied while keeping the predetermined pressure 42 that is applied to the reaction plate 54 at optimum levels for the friction surfaces 72 of the first and second friction plates 62, 64.

The order of method steps listed above and in the appended claims is not intended as limiting unless otherwise noted. The disclosed method may be practiced by performing the disclosed steps in a different order than that presented above. Additionally, the disclosed method may be practiced where one or more of the steps listed above are eliminated or where other steps are performed in addition to those described above. It should also be appreciated that method set forth above encompasses the operation of multi-level torque clutch assemblies 20 where the shaft 28 is used to drive rotation of the clutch housing 22, where the clutch housing 22 is used to drive rotation of the shaft 28, where the clutch housing 22 is used to slow rotation of (i.e. act as a brake for) the shaft 28, and/or where the shaft 28 is used to slow rotation of (i.e. act as a brake for) the clutch housing 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. A multi-level torque clutch assembly comprising:
   a clutch housing having an internal surface that defines an inner cavity within said clutch housing;

a shaft disposed within said inner cavity of said clutch housing, said shaft extending along a longitudinal axis and having an outer surface;

a clutch pack disposed radially between said clutch housing and said shaft that selectively couples rotation of said clutch housing and said shaft;

said clutch pack including a first end and a second end opposite said first end that is longitudinally spaced from said first end;

a first actuator that selectively applies pressure to said first end of said clutch pack to force said first end toward said second end and longitudinally compress said clutch pack;

said clutch pack including a primary backing plate disposed at said second end of said clutch pack, wherein said primary backing plate is retained on one of said clutch housing and said shaft such that said primary backing plate cannot move longitudinally relative to said clutch housing and said shaft beyond a predetermined limit;

said clutch pack including a reaction plate disposed at said first end of said clutch pack that operably receives pressure from said first actuator and that is moveable along said longitudinal axis relative to said clutch housing and said shaft;

said clutch pack including a first friction plate and a second friction plate disposed adjacent one another and between said primary backing plate and said reaction plate, said first and second friction plates being moveable along said longitudinal axis relative to said clutch housing and said shaft;

said clutch pack including a secondary backing plate disposed between said first and second friction plates; and a second actuator controlling movement of said secondary backing plate to selectively switch said clutch pack between a low torque state and a high torque state, wherein said second actuator prevents said secondary backing plate from moving longitudinally toward said primary backing plate beyond a locked position when said clutch pack is in said low torque state, and wherein said second actuator permits longitudinal movement of said secondary backing plate toward said primary backing plate beyond said locked position when said clutch pack is in said high torque state.

2. The multi-level torque clutch assembly as set forth in claim 1 wherein said second actuator includes a locking member that selectively moves between a retracted position and an extended position, wherein said locking member moves to said retracted position when said second actuator switches said clutch pack to said high torque state, and said locking member moves to said extended position when said second actuator switches said clutch pack to said low torque state.

3. The multi-level torque clutch assembly as set forth in claim 2 wherein said locking member of said second actuator extends into said inner cavity in said extended position to engage said secondary backing plate and prevent said secondary backing plate from moving longitudinally toward said primary backing plate beyond said locked position.

4. The multi-level torque clutch assembly as set forth in claim 3 wherein said locking member of said second actuator does not extend into said inner cavity in said retracted position such that said secondary backing plate is free to move longitudinally toward said primary backing plate beyond said locked position in response to said first actuator applying pressure to said reaction plate.

5. The multi-level torque clutch assembly as set forth in claim 3 wherein said second actuator is disposed in said clutch housing such that said locking member projects from said internal surface of said clutch housing in said extended position and is retracted within said clutch housing in said retracted position.

6. The multi-level torque clutch assembly as set forth in claim 3 wherein said second actuator is disposed in said shaft such that said locking member projects from said outer surface of said shaft in said extended position and is retracted within said shaft in said retracted position.

7. The multi-level torque clutch assembly as set forth in claim 2 wherein said secondary backing plate has a recess that operably receives said locking member when said second actuator moves said locking member to said extended position to longitudinally fix said secondary backing plate in place relative to said primary backing plate.

8. The multi-level torque clutch assembly as set forth in claim 2 wherein said locking member is disposed to one side of said secondary backing plate when said second actuator moves said locking member to said extended position such that said locking member acts as a stop to maintain a predetermined distance between said secondary backing plate and said primary backing plate when said second actuator switches said clutch pack to said low torque state and said first actuator applies pressure to said reaction plate.

9. The multi-level torque clutch assembly as set forth in claim 1 wherein said secondary backing plate does not press said second friction plate against said primary backing plate when said second actuator switches said clutch pack to said low torque state and said first actuator applies pressure to said reaction plate.

10. The multi-level torque clutch assembly as set forth in claim 1 wherein said first actuator is disposed adjacent said clutch pack and operably switches said clutch pack between an open state and a closed state, wherein said clutch pack moves to said open state when said first actuator does not apply pressure to said reaction plate, and said clutch pack moves to said closed state when said first actuator applies pressure to said reaction plate to force said reaction plate toward said primary backing plate.

11. The multi-level torque clutch assembly as set forth in claim 1 wherein said reaction plate moves longitudinally toward said primary backing plate in response to said first actuator applying pressure to said reaction plate.

12. The multi-level torque clutch assembly as set forth in claim 11 wherein, when said clutch pack is in said high torque state, said first and second friction plates move longitudinally toward said primary backing plate in response to said reaction plate moving toward primary backing plate such that said first and second friction plates are squeezed between said reaction plate and said primary backing plate as said clutch pack is compressed by said first actuator.

13. The multi-level torque clutch assembly as set forth in claim 1 wherein said primary backing plate and said reaction plate are rotatably coupled with said clutch housing such that said primary backing plate and said reaction plate rotate with said clutch housing.

14. The multi-level torque clutch assembly as set forth in claim 13 wherein said first and second friction plates are rotatably coupled with said shaft such that said first and second friction plates rotate with said shaft.

15. The multi-level torque clutch assembly as set forth in claim 1 wherein said primary backing plate and said reaction plate are rotatably coupled with said shaft such that said primary backing plate and said reaction plate rotate with said shaft.

16. The multi-level torque clutch assembly as set forth in claim 15 wherein said first and second friction plates are rotatably coupled with said clutch housing such that said first and second friction plates rotate with said clutch housing.

17. The multi-level torque clutch assembly as set forth in claim 1 wherein each of said first and second friction plates has an annular shape and a first side and a second side that is longitudinally spaced from said first side, each of said first and second friction plates including a friction surface disposed on at least one of said first side and said second side that transfers torque between said first and second friction plates and at least one of said reaction plate, said primary backing plate, and said secondary backing plate when said clutch pack is compressed to rotatably couple said clutch housing and said shaft.

18. The multi-level torque clutch assembly as set forth in claim 1 wherein said second actuator includes a locking member that moves longitudinally with said secondary backing plate and that stops movement of said secondary backing plate towards said primary backing plate at said locked position to switch said clutch pack to said low torque state.

19. A clutch assembly comprising:
a clutch housing;
a shaft disposed within said clutch housing, said shaft extending along a longitudinal axis;
a clutch pack disposed radially between said clutch housing and said shaft that selectively couples rotation of said clutch housing and said shaft;
said clutch pack including a primary backing plate that is retained on one of said clutch housing and said shaft such that said primary backing plate cannot move longitudinally relative to said clutch housing and said shaft beyond a predetermined limit;
said clutch pack including a reaction plate that is longitudinally spaced from said primary backing plate, said reaction plate being moveable along said longitudinal axis relative to said clutch housing and said shaft;
said clutch pack including a first friction plate and a second friction plate disposed adjacent one another and between said primary backing plate and said reaction plate, said first and second friction plates being moveable along said longitudinal axis relative to said clutch housing and said shaft;
a first actuator disposed adjacent said clutch pack that selectively applies a predetermined pressure to said reaction plate;
said clutch pack including a secondary backing plate disposed between said first and second friction plates; and
a second actuator controlling movement of said secondary backing plate to selectively switch said clutch pack between a low torque state and a high torque state, wherein said second actuator prevents said secondary backing plate from moving longitudinally toward said primary backing plate beyond a locked position when said clutch pack is in said low torque state such that one of said first and second friction plates is clamped between said reaction plate and said secondary backing plate when said first actuator applies said predetermined pressure to said reaction plate, and wherein said second actuator permits longitudinal movement of said secondary backing plate toward said primary backing plate beyond said locked position when said clutch pack is in said high torque state such that said secondary backing plate and said first and second friction plates are clamped between said reaction plate and said primary backing plate when said first actuator applies said predetermined pressure to said reaction plate.

20. The clutch assembly as set forth in claim 19 wherein said second actuator includes a locking member that that moves longitudinally relative to said clutch housing and that stops movement of said secondary backing plate towards said primary backing plate at said locked position to switch said clutch pack to said low torque state.

21. The clutch assembly as set forth in claim 20 wherein said locking member includes a first leg, a second leg, and a bridging portion, said bridging portion arranged parallel to said longitudinal axis and positioned radially between said clutch housing and said reaction plate, and said first leg and said second leg being longitudinally spaced apart and transverse to said bridging portion.

22. The clutch assembly as set forth in claim 21 wherein said second actuator includes an actuator cavity that is position adjacent to said reaction plate and wherein said second leg of said locking member is received in said actuator cavity.

23. The clutch assembly as set forth in claim 22 wherein said second actuator controls longitudinal movement of said locking member by pressurizing said actuator cavity with fluid that acts on said second leg of said locking member.

24. The clutch assembly as set forth in claim 21 wherein said secondary backing plate includes a recess that receives said first leg of said locking member.

25. The clutch assembly as set forth in claim 21 wherein said locking member includes a third leg that is spaced longitudinally between said first leg and said second leg of said locking member and is transverse to said bridging portion and wherein at least part of said secondary backing plate is received between said first leg and said third leg of said locking member.

26. The clutch assembly as set forth in claim 19 wherein said second actuator includes a locking member that selectively moves between a retracted position and an extended position, wherein said locking member moves to said retracted position when said second actuator switches said clutch pack to said high torque state, and wherein said locking member moves to said extended position when said second actuator switches said clutch pack to said low torque state.

27. A method of operating a clutch assembly comprising the steps of:
rotating at least one of a clutch housing and a shaft disposed within the clutch housing;
rotating one or more components of a clutch pack in response to said step of rotating at least one of the clutch housing and the shaft, the components of the clutch pack including at least a reaction plate, a primary backing plate, first and second friction plates positioned longitudinally between the reaction plate and the primary backing plate, and a secondary backing plate positioned longitudinally between the first and second friction plates;
initiating a low torque state by preventing the secondary backing plate from moving longitudinally toward the primary backing plate beyond a locked position;
applying a predetermined pressure to the reaction plate to squeeze one of the first and second friction plates between the reaction plate and the secondary backing plate while isolating another one of the first and second friction plates from the predetermined pressure;

initiating a high torque state by allowing the secondary backing plate to move longitudinally toward the primary backing plate beyond the locked position; and applying the predetermined pressure to the reaction plate to squeeze both of the first and second friction plates and the secondary backing plate between the reaction plate and the primary backing plate.

28. The method as set forth in claim 27 further comprising the steps of:

generating torque transfer between the clutch housing and the shaft using a first number of the components of the clutch pack in response to said step of initiating the low torque state; and generating torque transfer between the clutch housing and the shaft using a second number of the components of the clutch pack in response to said step of initiating the high torque state, wherein the second number of components of the clutch pack is greater than the first number of components of the clutch pack.

29. The method as set forth in claim 28 wherein the torque transfer generated between the clutch housing and the shaft when the low torque state has been initiated is less than the torque transfer generated between the clutch housing and the shaft when the high torque state has been initiated even though the predetermined pressure applied to the reaction plate remains the same.

* * * * *

UNITED STATES PATENT AND TRADEMARK OFFICE
CERTIFICATE OF CORRECTION

PATENT NO. : 9,920,795 B2
APPLICATION NO. : 14/956861
DATED : March 20, 2018
INVENTOR(S) : Gregory Mordukhovich et al.

Page 1 of 1

It is certified that error appears in the above-identified patent and that said Letters Patent is hereby corrected as shown below:

On the Title Page

(73) Assignee, Line 2 delete "MN" and insert --MI--

Signed and Sealed this
Nineteenth Day of June, 2018

Andrei Iancu
*Director of the United States Patent and Trademark Office*